US010607548B2

(12) United States Patent
Lee

(10) Patent No.: US 10,607,548 B2
(45) Date of Patent: Mar. 31, 2020

(54) DISPLAY DEVICE THAT SENSES CURRENT FLOWING THROUGH A PIXEL AND METHOD OF DRIVING THE SAME

(71) Applicant: SAMSUNG DISPLAY CO., LTD., Yongin-si, Gyeonggi-do (KR)

(72) Inventor: Wook Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/043,794

(22) Filed: Jul. 24, 2018

(65) Prior Publication Data

US 2019/0051250 A1 Feb. 14, 2019

(30) Foreign Application Priority Data

Aug. 8, 2017 (KR) ........................ 10-2017-0100367

(51) Int. Cl.
*G06F 3/038* (2013.01)
*G09G 5/00* (2006.01)
*G09G 3/3266* (2016.01)

(52) U.S. Cl.
CPC ....... *G09G 3/3266* (2013.01); *G09G 2310/08* (2013.01); *G09G 2320/029* (2013.01); *G09G 2320/0247* (2013.01)

(58) Field of Classification Search
None
See application file for complete search history.

(56) References Cited

U.S. PATENT DOCUMENTS 7,471,267 B2 12/2008 Shin et al.
7,710,377 B2 5/2010 Kang et al.
8,378,951 B2 2/2013 Yen et al.
9,330,593 B2 5/2016 Jang
9,548,026 B2 1/2017 Jang
(Continued)

FOREIGN PATENT DOCUMENTS

JP 11024043 A * 1/1999
KR 100515351 B1 9/2005
(Continued)

OTHER PUBLICATIONS

Dae Seok Oh et al., Low Frequency Driving Display to Reduce Logic Power in Liquid Crystal Display, 2014, p. 1199-1201, vol. 45, SID.

*Primary Examiner* — Priyank J Shah
*Assistant Examiner* — Kirk W Hermann
(74) *Attorney, Agent, or Firm* — Cantor Colburn LLP

(57) ABSTRACT

A display device includes first pixels connected to first scan lines and data lines, a second pixel region including a second scan line and control line and at least one second pixel connected to the second scan line and the control line, a scan driver which drives at least the first scan lines, a sensor unit which is connected to the second pixel and senses current that flows through the second pixel in response to a sensing mode in a predetermined sensing period, and a timing controller which drives the sensor unit in response to the sensing mode, controls a driving order of the first scan lines in response to a first mode, and sets a division driving condition of the first scan lines in the first mode in response to a sensing signal input from the sensor unit in the sensing period.

18 Claims, 14 Drawing Sheets

(56) References Cited

U.S. PATENT DOCUMENTS

2004/0174320 A1* 9/2004 Matthijs ................. G09G 3/006
345/30
2006/0066555 A1 3/2006 Miyagawa
2015/0154902 A1* 6/2015 Lee .......................... G09G 3/20
345/213
2016/0086541 A1* 3/2016 Yang .................... G09G 3/3258
345/691
2016/0140898 A1* 5/2016 Hyun ................... G09G 3/3233
345/694
2016/0155381 A1* 6/2016 Kwon .................. G09G 3/3233
345/215
2018/0366061 A1* 12/2018 Furukawa ............ G09G 3/3233

FOREIGN PATENT DOCUMENTS

KR 100688498 B1 2/2007
KR 1020140025149 A 3/2014
KR 1020140038148 A 3/2014

* cited by examiner

DISPLAY DEVICE THAT SENSES CURRENT FLOWING THROUGH A PIXEL AND METHOD OF DRIVING THE SAME

This application claims priority to Korean Patent Application No. 10-2017-0100367, filed on Aug. 8, 2017, and all the benefits accruing therefrom under 35 U.S.C. § 119, the content of which in its entirety is herein incorporated by reference.

BACKGROUND

1. Field

Exemplary embodiments of the invention relate to a display device and a method of driving the same.

2. Description of the Related Art

Recently, as display devices are widely used for mobile devices, various methods of reducing power consumption of the display devices are tried. A display device in which a driving frequency changes in accordance with a use state of the display device or a kind of an image, for example, is being developed.

SUMMARY

An exemplary embodiment of the invention relates to a display device capable of preventing picture quality from deteriorating due to flicker even in a first mode in which the display device is driven at a low frequency and a method of driving the same.

A display device according to an exemplary embodiment of the invention includes a first pixel region including a plurality of first scan lines, a plurality of data lines and a plurality of first pixels connected to the plurality of first scan lines and the plurality of data lines, a second pixel region including a second scan line and control line and a second pixel connected to the second scan line and the control line, a scan driver which drives at least one of the plurality of first scan lines, a sensor unit which is connected to the second pixel and senses current that flows through the second pixel in response to a sensing mode in a predetermined sensing period, and a timing controller which drives the sensor unit in response to the sensing mode and controls a driving order of the plurality of first scan lines in response to a first mode. The timing controller divides a one frame period into a plurality of sub-periods in response to the first mode, controls the scan driver so that at least two of the plurality of first scan lines sequentially arranged in the first pixel region are driven in different sub-periods, and sets a driving condition of the plurality of first scan lines in the first mode in response to a sensing signal input from the sensor unit in the predetermined sensing period.

In an exemplary embodiment, the driving condition of the plurality of first scan lines may include at least one of the plurality of driving order of the first scan lines and a time difference between the scan signals supplied to the sequentially arranged at least two of the plurality of first scan lines.

In an exemplary embodiment, the timing controller may set a number of sub-periods in response to an amplitude of the sensing signal and the driving order of the plurality of first scan lines in response to the number of sub-periods.

In an exemplary embodiment, the timing controller may control a time difference between the scan signals supplied to the sequentially arranged at least two of the plurality of first scan lines in a period in which the first mode is executed in response to a shape of a curve of the sensing signal.

In an exemplary embodiment, each of the plurality of first pixels may include a first pixel circuit connected to a predetermined first scan line of the plurality of first scan lines and a predetermined data line of the plurality of data lines and a first organic light emitting diode ("OLED") connected to the first pixel circuit.

In an exemplary embodiment, the second pixel may include a second pixel circuit connected to the second scan line and a predetermined data line of the plurality of data lines, a second OLED connected to the second pixel circuit, and a switching element including a first electrode connected to the second pixel circuit and the second OLED, a second electrode connected to the sensor unit through the predetermined data line, and a control electrode connected to the control line.

In an exemplary embodiment, the first pixel circuit and the second pixel circuit may have the same structure.

In an exemplary embodiment, the second scan line may receive a scan signal of a gate on voltage in a first period of the predetermined sensing period. The control line may receive a control signal of a gate on voltage in a second period subsequent to the first period of the predetermined sensing period.

In an exemplary embodiment, the sensor unit may include a first amplifier which is connected to a data line of the plurality of data lines connected to the second pixel and amplifies current input from the second pixel via the switching element in the predetermined sensing period and a first analog-to-digital converter ("ADC") connected to an output terminal of the first amplifier.

In an exemplary embodiment, the second pixel region may further include a third pixel connected to the second scan line and having the same structure as that of the second pixel excluding the switching element.

In an exemplary embodiment, the sensor unit may further include a second amplifier which is connected to a data line of the plurality of data lines connected to the third pixel and amplifies current input from the data line of the third pixel in the predetermined sensing period.

In an exemplary embodiment, the sensor unit may further include a first switch connected between the first amplifier and the first ADC and a second switch connected between the second amplifier and the first ADC and turned on in a period different from a period in which the first switch is turned on in the predetermined sensing period.

In an exemplary embodiment, the second pixel region may further include at least two second pixels and at least two third pixels. The sensor unit may further include a selecting unit including a plurality of third switches connected between the second pixels and the first amplifier and a plurality of fourth switches connected between data lines of the plurality of data lines connected to the at least two third pixels and the second amplifier.

In an exemplary embodiment, the second pixel region may further include at least two second pixels and at least two third pixels. The first amplifier may be commonly connected to the second pixels and the second amplifier may be commonly connected to data lines of the plurality of data lines connected to the at least two third pixels.

In an exemplary embodiment, a predetermined standby image may be displayed in response to a first driving frequency in a period in which the first mode is executed.

In an exemplary embodiment, the timing controller may control the scan driver so that the plurality of first scan lines is sequentially driven in response to a second mode in which the display device is driven at a second driving frequency higher than the first driving frequency.

A method of driving a display device according to an exemplary embodiment of the invention includes sensing current that flows through at least one pixel provided in a display panel and generating a sensing signal in a predetermined sensing period, controlling a driving condition of scan lines in a first mode in response to the sensing signal, and dividing a one frame period into a plurality of sub-periods in a period in which the first mode is executed and driving the scan lines so that at least two scan lines sequentially arranged in a display region among the scan lines are driven in different sub-periods. The controlling of the driving condition of the scan lines in the first mode includes setting at least one of the driving order of the scan lines and a time difference between scan signals supplied to the sequentially arranged at least two scan lines in response to the sensing signal.

In an exemplary embodiment, a number of sub-periods may be set in response to an amplitude of the sensing signal and the driving order of the first scan lines may be set in response to the number of sub-periods.

In an exemplary embodiment, the time difference between the scan signals supplied to the sequentially arranged at least two scan lines may be controlled in the period in which the first mode is executed, in response to a shape of a curve of the sensing signal.

In an exemplary embodiment, the scan lines arranged in the display region may be sequentially driven in response to a second mode in which the display device is driven at a higher frequency than in the first mode.

According to the exemplary embodiment of the invention, the one frame period may be divided into the plurality of sub-periods in response to the first mode that is a low frequency driving mode and the first scan lines may be dividedly driven so that the sequentially arranged at least two scan lines among the first scan lines provided in the display region are driven in different sub-periods. Therefore, it is possible to reduce power consumption and to prevent picture quality from deteriorating due to flicker.

In addition, according to the exemplary embodiment of the invention, current that flows through at least one pixel provided in a display panel may be sensed in a predetermined sensing period and a driving condition of first scan lines applied to the first mode may be controlled in consideration of the sensed current. Therefore, it is possible to effectively prevent picture quality from deteriorating in the first mode.

BRIEF DESCRIPTION OF THE DRAWINGS

Exemplary embodiments will now be described more fully hereinafter with reference to the accompanying drawings, in which.

DETAILED DESCRIPTION

Figure 1:
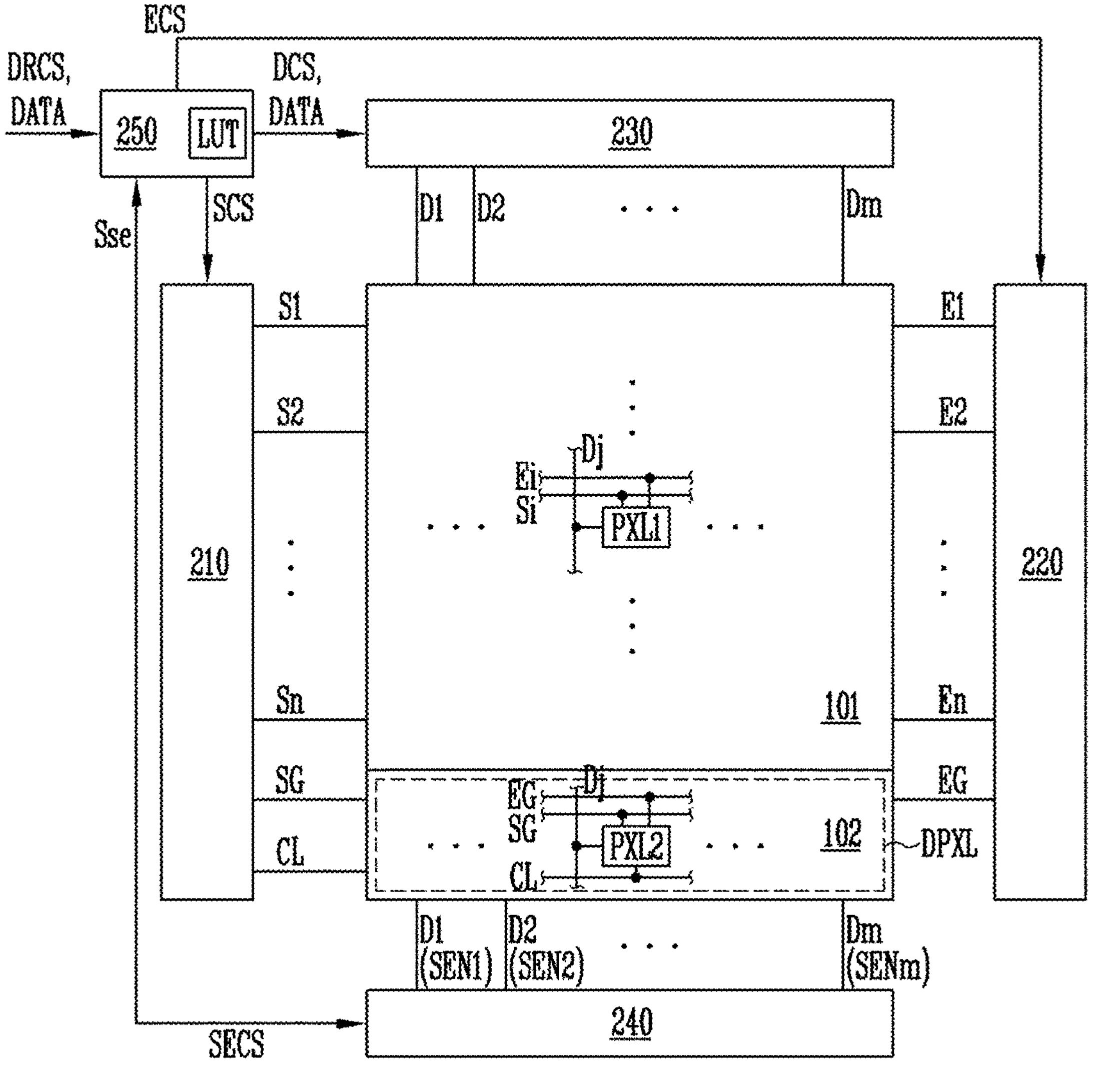
FIG. 1 is a view illustrating a display device according to an exemplary embodiment of the invention.

Exemplary embodiments will now be described more fully hereinafter with reference to the accompanying drawings; however, they may be embodied in different forms and should not be construed as limited to the exemplary embodiments set forth herein. Rather, these embodiments are provided so that this disclosure will be thorough and complete, and will full convey the scope of the exemplary embodiments to those skilled in the art. It will be understood that when an element is referred to as being connected to another element, it can be directly connected to the other element, or one or more intervening elements may also be present.

In the accompanying drawings, a portion irrelevant to description of the invention will be omitted for clarity. In addition, in the drawing figures, dimensions may be exaggerated for clarity of illustration. Like reference numerals refer to like elements throughout. In addition, detailed description of elements the same as or similar to those of a previously described embodiment will not be given.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a view illustrating a display device according to an exemplary embodiment of the invention. For convenience sake, hereinafter, the invention is described with reference to an organic light emitting display device. However, kinds of display devices that may be applied to the invention are not limited thereto.

Referring to FIG. 1, the display device according to the exemplary embodiment of the invention includes a display panel including first and second pixel regions 101 and 102 and a driving circuit including a scan driver 210 for driving the first and second pixel regions 101 and 102, an emission control driver 220, a data driver 230, and a timing controller 250. In addition, the driving circuit may further include a sensor unit 240 for sensing current that flows through the display panel.

According to an exemplary embodiment, the scan driver 210, the emission control driver 220, the data driver 230, the sensor unit 240, and/or the timing controller 250 are integrated in one integrated circuit ("IC") chip or may be separate from each other. In addition, the scan driver 210, the emission control driver 220, the data driver 230, the sensor unit 240, and/or the timing controller 250 are integrated on the display panel with the first and second pixel regions 101 and 102, may be mounted (e.g., disposed) on a region of the display panel, or may be provided outside the display panel.

The first pixel region 101 includes a plurality of first scan lines S1 through Sn and data lines D1 through Dm and a plurality of first pixels PXL1 connected to the first scan lines S1 through Sn and the data lines D1 through Dm, where n and m are natural numbers. In addition, according to an exemplary embodiment, the first pixel region 101 may further include a plurality of first emission control lines E1 through En. The first emission control lines E1 through En may be omitted according to another exemplary embodiment. In addition, according to an exemplary embodiment, one or more initializing scan lines that are not shown may be further provided in the first pixel region 101. In an exemplary embodiment, one or more initializing scan lines may be provided at an upper end of the first pixels PXL1 arranged in a first row (a first pixel row), for example. The first pixel region 101 may be a display region for displaying a desired image.

The first pixels PXL1 are selected when scan signals are supplied to the first scan lines S1 through Sn and receive data signals from the data lines D1 through Dm. The first pixels PXL1 that receive the data signals emit light components with brightness components corresponding to the data signals in a predetermined light emitting period. According to an exemplary embodiment, the light emitting period of the first pixels PXL1 may be controlled by emission control signals supplied from the first emission control lines E1 through En. For this purpose, the first pixels PXL1 may be further connected to the first emission control lines E1 through En. In an exemplary embodiment, the first pixel PXL1 positioned in an ith (i is a natural number) row and a jth (j is a natural number) column of the first pixel region 101 may be connected to an ith scan line Si, an ith emission control line Ei, and a jth data line Dj, for example. In addition, according to an exemplary embodiment, the first pixel PXL1 may be further connected to one or more other scan lines for initialization.

According to the exemplary embodiment of the invention, the first pixel region 101 may be driven in at least two modes in which the first pixel region 101 is driven at different driving frequencies. In an exemplary embodiment, the first pixel region 101 may be driven in a first mode in which the first pixel region 101 is driven at a first driving frequency, e.g., less than about 60 Hertz (Hz), and a second mode in which the first pixel region 101 is driven at a second driving frequency, e.g., equal to or greater than about 60 Hz, higher than the first driving frequency, for example.

According to an exemplary embodiment, the first mode may be a low frequency driving mode in which a predetermined standby image is displayed. In an exemplary embodiment, the first mode may be an always-on-display ("AOD") mode in which the predetermined standby image is continuously displayed in response to the first driving frequency, for example. When predetermined information is displayed on the predetermined standby image even in a period in which the display device is not used, it is possible to increase convenience of use.

In addition, according to the exemplary embodiment of the invention, in a period in which the first mode is executed, a refresh rate is minimized by low frequency driving. According to an exemplary embodiment, the first driving frequency applied to the first mode may be set in a low frequency range less than about 60 Hz, for example, in a low frequency range equal to or less than about 30 Hz. In an exemplary embodiment, the first driving frequency may be set as about 1 Hz or about 2 Hz, for example. However, the invention is not limited thereto. That is, according to the exemplary embodiment, the first driving frequency may vary in a predetermined low frequency range. Therefore, it is possible to minimize increase in power consumption in accordance with implementation of the AOD mode.

When the driving frequency of the first pixel region 101 is reduced, for example, when the first pixels PXL1 are driven at the driving frequency equal to or less than about 2 Hz, flicker may occur due to leakage current generated by the first pixels XPL1. According to the exemplary embodiment of the invention, the flicker generated in the first pixels PXL1 is dispersed by driving the first pixels PXL1 in a division scanning method in the period in which the first mode is executed.

According to the exemplary embodiment of the invention, the division scanning method may mean a scanning method in which one frame period is divided into a plurality of sub-periods and at least two sequentially arranged first scan lines among the first scan lines S1 through Sn provided in the display region (that is, the first pixel region 101) are controlled to be dividedly driven in different sub-periods. When the division scanning method is applied, for example, the first first scan line S1 and the second first scan line S2 may be dividedly driven in different sub-periods with a time difference corresponding to continuation time of the sub-periods (or the first driving frequency). In an exemplary embodiment, an interlace scanning method may be used as the division scanning method.

In particular, according to the exemplary embodiment of the invention, it is possible to reduce power consumption and to effectively disperse flicker by controlling a division scanning condition (for example, a division driving condition of the first scan lines S1 through Sn) in accordance with a characteristic or a use environment of the display panel. Therefore, it is possible to prevent picture quality from deteriorating due to flicker even in the first mode. According to an exemplary embodiment, the driving condition of the first scan lines S1 through Sn may include at least one among a driving order of the first scan lines S1 through Sn, a time difference between scan signals supplied to at least two first scan lines sequentially arranged in the first pixel region 101, and the first driving frequency.

The second mode may be a common display mode executed in the period in which the display device is used and may be a high frequency driving mode in which the display device is driven at a higher speed than in the first mode. In the period in which the second mode is executed, the first pixels PXL1 may be driven in a sequential scanning method. In the period in which the second mode is executed, the first pixels PXL1 are driven at a high speed at a frequency enough to prevent picture quality from deteriorating due to flicker, for example, at a frequency equal to or greater than about 60 Hz. That is, according to the exemplary embodiment of the invention, the second mode corresponds to a high frequency driving mode such as the common display mode, to which a sequential driving method is applied.

The second pixel region 102 may be positioned at at least one side of the first pixel region 101. In an exemplary embodiment, the second pixel region 102 may be positioned at an upper or lower end of the first pixel region 101, for example.

The second pixel region 102 may include at least one second scan line SG and control line CL and at least one dummy pixel connected to the second scan line SG and the control line CL, for example, at least one second pixel PXL2. In an exemplary embodiment, the second pixel region 102 may include at least one dummy pixel row DPXL connected to each of the data lines D1 through Dm. The dummy pixel row DPXL may include at least one second pixel PXL2, for example.

According to an exemplary embodiment, the second pixel PXL2 may be connected to a predetermined second scan line SG, control line CL, and data line (one of D1 through Dm, for example, Dj). According to an exemplary embodiment, at least one second emission control line EG is further provided in the second pixel region 102 and the second pixel PXL2 may be further connected to the second emission control line EG.

According to an exemplary embodiment, the dummy pixel row DPXL may be connected to the sensor unit 240 through the data lines D1 through Dm. However, the invention is not limited thereto. According to another exemplary embodiment, the dummy pixel row DPXL may be connected to the sensor unit 240 through additional sensing lines SEN1 through SENm separate from the data lines D1 through Dm, for example.

The dummy pixel row DPXL may be driven in a predetermined sensing period. In addition, in the sensing period, current that flows through at least one second pixel PXL2 may be supplied to the sensor unit 240 via the data line Dj of the second pixel PXL2. According to an exemplary embodiment, the second pixel PXL2 may have a structure the same or similar to that of the first pixel PXL1. Therefore, when current that flows through the second pixel PXL2 is measured, a characteristic of current that flows through the first pixel PXL1 may be estimated.

The scan driver 210 receives a scan control signal SCS from the timing controller 250 and drives at least the first scan lines S1 through Sn in response to the scan control signal SCS. In an exemplary embodiment, the scan driver 210 may drive the first scan lines S1 through Sn in the sequential scanning method in the period in which the first mode is executed in response to the scan control signal SCS corresponding to the first mode, for example. In addition, the scan driver 210 may drive the first scan lines S1 through Sn in the sequential scanning method in the period in which the second mode is executed in response to the scan control signal SCS corresponding to the second mode. That is, the scan driver 210 supplies scan signals to the first scan lines S1 through Sn in the division scanning method in response to the first mode and may supply the scan signals to the first scan lines S1 through Sn in the sequential scanning method in response to the second mode.

According to an exemplary embodiment, the scan driver 210 may be implemented by a decoder for outputting a scan signal to a predetermined first scan line in response to the scan control signal SCS including at least an addressing signal. According to another exemplary embodiment, the scan driver 210 includes a shift register and may be implemented by a shift register type scan driving circuit of currently known various structures for supporting a non-sequential driving method (or an interlace driving method).

In addition, according to the exemplary embodiment of the invention, the scan driver 210 may further drive at least one second scan line SG and control line CL for controlling the driving of the dummy pixel row DPXL. In an exemplary embodiment, the scan driver 210 may drive the dummy pixel row DPXL in response to the scan control signal SCS corresponding to a sensing mode in the predetermined sensing period, for example. According to another exemplary embodiment, the second scan line SG and/or the control line CL may be driven by another driver that is not shown. In an exemplary embodiment, a control line driver that is not shown may be further provided in the display device and the control line CL may be driven by the control line driver, for example. According to another exemplary embodiment, the timing controller 250 may directly supply a predetermined driving signal to the second scan line SG and/or the control line CL.

The emission control driver 220 receives an emission driving signal ECS from the timing controller 250 and drives at least the first emission control lines E1 through En in response to the emission driving signal ECS. In an exemplary embodiment, the emission control driver 220 may drive the first emission control lines E1 through En at driving points of time of the first scan lines S1 through Sn in response to the emission driving signal ECS, for example. In an exemplary embodiment, the emission control driver 220 divides the first emission control lines E1 through En in response to the first mode and may supply the emission control signals to the first emission control lines E1 through En that belong to a predetermined group in a predetermined sub-period included in each frame period, for example. In addition, the emission control driver 220 may supply the emission control signals to the first emission control lines E1 through En in the sequential driving method in each frame period in response to the second mode.

In addition, according to the exemplary embodiment of the invention, the emission control driver 220 may further drive at least one second emission control line EG for controlling emission time of the dummy pixel row DPXL. In an exemplary embodiment, the emission control driver 220 may control emission of the dummy pixel row DPXL in the predetermined sensing period in response to the emission driving signal ECS corresponding to the sensing mode, for example. According to another exemplary embodiment, the second emission control line EG may be driven by another driver that is not shown. In an exemplary embodiment, one or more control line drivers are further provided in the display device and at least the second emission control line EG may be driven by the control line driver, for example. According to another exemplary embodiment, the timing controller 250 may directly supply a predetermined driving signal to the second emission control line EG.

The data driver 230 receives a data control signal DCS and image data DATA from the timing controller 250 and drives the data lines D1 through Dm in response to the data control signal DCS and the image data DATA. In an exemplary embodiment, the data driver 230 generates the data signals in response to the data control signal DCS and the image data DATA and may supply the data signals to the data lines D1 through Dm, for example.

According to an exemplary embodiment, the data driver 230 may supply data signals of the respective pixel rows arranged in the first pixel region 101 in a sequential scanning order corresponding to the first mode in the period in which the first mode is executed. In addition, the data driver 230 may sequentially supply the data signals of the respective pixel rows arranged in the first pixel region 101 in response to the second mode in the period in which the second mode is executed.

The sensor unit 240 is connected to the dummy pixel row DPXL arranged in the second pixel region 102 through at least one data line (at least one of D1 through Dm) or at least one sensing line (at least one of SEN1 through SENm). In particular, the sensor unit 240 is connected to at least one second pixel PXL2 in the predetermined sensing period and may sense current that flows through the second pixel PXL2. That is, according to an exemplary embodiment, the sensor unit 240 may be implemented by a current sensor for sensing current that flows through the display panel.

The sensor unit 240 receives a sensing control signal SECS from the timing controller 250 in response to the sensing mode in the predetermined sensing period and generates a sensing signal Sse corresponding to the current sensed from the dummy pixel row DPXL in response to the sensing control signal SECS. The sensing signal Sse may be supplied to the timing controller 250.

The timing controller 250 receives a driving control signal DRCS and the image data DATA from a host processor and drives the scan driver 210, the emission control driver 220, the data driver 230, and the sensor unit 240 in response to the driving control signal DRCS and the image data DATA. According to an exemplary embodiment, the driving control signal DRCS may include various timing signals (for example, a horizontal synchronizing signal and a vertical synchronizing signal) for controlling the driving of the display device. In addition, according to the exemplary embodiment of the invention, the driving control signal DRCS may further include the sensing control signal SECS for sensing current that flows through at least one pixel (for example, at least one second pixel PXL2) provided in the display panel in the predetermined sensing period.

The timing controller 250 determines a driving mode of the display device in response to the driving control signal DRCS and drives the scan driver 210, the emission control driver 220, the data driver 230, and/or the sensor unit 240 in response to each driving mode. In particular, according to the exemplary embodiment of the invention, the timing controller 250 controls the driving order of the first scan lines S1 through Sn in response to a low frequency driving mode, that is, the first mode. In an exemplary embodiment, the timing controller 250 divides one frame period into a plurality of sub-periods in response to the first mode and may set the driving order of the first scan lines S1 through Sn so that at least two first scan lines sequentially arranged in the first pixel region 101 are driven in different sub-periods, for example.

More specifically, the timing controller 250 may control the driving of the scan driver 210, the emission control driver 220, and the data driver 230 so that the first pixel region 101 is driven in the division scanning method when the driving control signal DRCS corresponding to the first mode is supplied. In an exemplary embodiment, the timing controller 250 may control operations of the scan driver 210, the emission control driver 220, and the data driver 230 in accordance with a predetermined division scanning condition (for example, a driving condition of the first scan lines S1 through Sn including a first driving frequency and/or division scanning intervals) of the first mode when the driving control signal DRCS corresponding to the first mode is supplied, for example. In an exemplary embodiment, the timing controller 250 may supply an addressing signal to the scan driver 210 in accordance with the predetermined division scanning condition when the driving control signal DRCS corresponding to the first mode is supplied, for example. In addition, the timing controller 250 realigns the image data DATA in the driving order of the first scan lines S1 through Sn specified in the division scanning condition and may supply the realigned image data DATA to the data driver 230.

The timing controller 250 may control the driving of the scan driver 210, the emission control driver 220, and the data driver 230 so that the scan driver 210, the emission control driver 220, and the data driver 230 operate in the second mode when the driving control signal DRCS corresponding to a high frequency driving mode, that is, the second mode is supplied. In an exemplary embodiment, the timing controller 250 may control operations of the scan driver 210, the emission control driver 220, and the data driver 230 so that the first pixel region 101 is driven in the sequential scanning method when the driving control signal DRCS corresponding to the second mode is supplied, for example.

In addition, the timing controller 250 may control the driving of the scan driver 210, the emission control driver 220, the data driver 230, and the sensor unit 240 so that the scan driver 210, the emission control driver 220, the data driver 230, and the sensor unit 240 operate in the sensing mode when the driving control signal DRCS corresponding to the sensing mode is supplied. In an exemplary embodiment, the timing controller 250 controls the scan driver 210, the emission control driver 220, and the data driver 230 so that the dummy pixel row DPXL of the second pixel region 102 is driven and may drive the sensor unit 240 so as to generate the sensing signal Sse corresponding to the sensing current output from the dummy pixel row DPXL when the driving control signal DRCS corresponding to the sensing mode is supplied, for example.

In addition, the timing controller 250 may supply predetermined sensing data to the data driver 230 in response to the sensing mode. Therefore, the data driver 230 may output a sensing data signal corresponding to the sensing data to the data lines D1 through Dm in the sensing period. According to the exemplary embodiment of the invention, a kind or grayscale of the sensing data is not limited. In an exemplary embodiment, the sensing data may be set as grayscale data (that is, data corresponding to grayscale higher than black grayscale) for performing control so that current flows through at least the second pixel PXL2 in the predetermined sensing period, for example.

In particular, according to the exemplary embodiment of the invention, the timing controller 250 controls the driving condition (that is, the division scanning condition) of the first scan lines S1 through Sn to be applied to the first mode in response to the sensing signal Sse input from the sensor unit 240 in the predetermined sensing period in which the sensing mode is executed. In an exemplary embodiment, the timing controller 250 may set the driving order of the first scan lines S1 through Sn in the first mode, supply points of time of the scan signals to be supplied to the first scan lines S1 through Sn, and/or the first driving frequency in response to an amplitude and/or a shape of a curve of the sensing signal Sse, for example. For this purpose, the timing controller 250 may include a lookup table LUT in which the division scanning condition corresponding to the sensing signal Sse is stored.

According to an exemplary embodiment, the timing controller 250 sets the number of sub-periods that configure one frame period in the period in which the first mode is executed in response to the amplitude of the sensing signal Sse and may set the driving order of the first scan lines S1 through Sn in response to the number of sub-periods. In an exemplary embodiment, the timing controller 250 may control division scanning intervals among the first scan lines S1 through Sn in response to the amplitude of the sensing signal Sse, for example.

In an exemplary embodiment, the timing controller 250 may divide the amplitude of the sensing signal Sse in accordance with a plurality of range periods, for example. The timing controller 250 divides one frame period into a larger number of sub-periods as the amplitude of the sensing signal Sse is larger (that is, as a change in current that flows through the display panel is larger) in response to predetermined sensing data and may control the scan driver 210 so that the first scan lines S1 through Sn are divided into a plurality of groups corresponding to the sub-periods and are driven.

In an exemplary embodiment, the timing controller 250 may interlace scan the first scan lines S1 through Sn by dividing one frame period into two sub-periods when the amplitude of the sensing signal Sse belongs to a first range, for example. In an exemplary embodiment, the timing controller 250 may control the scan driver 210 so that odd first scan lines S1, S3, . . . of a first group are sequentially driven in a first sub-period and even first scan lines S2, S4, . . . of a second group are sequentially driven in a second sub-period subsequent to the first sub-period, for example.

In addition, according to an exemplary embodiment, the timing controller 250 may divide one frame period into four sub-periods when the amplitude of the sensing signal Sse belongs to a second range having a larger value than the first range. The timing controller 250 may control sequentially arranged four first scan lines (for example, Si, Si+1, Si+2, and Si+3) to be driven in different sub-periods. As described above, when one frame period is divided into a larger number of sub-periods and the first scan lines S1 through Sn are dividedly scanned in accordance with the sub-periods, although stronger flicker is generated by each first pixel PXL1, the dispersing of flicker may be refined in the entire first pixel region 101. Therefore, it is possible to prevent picture quality from deteriorating due to low speed driving.

In addition, according to an exemplary embodiment, the timing controller 250 detects a shape of a curve of the sensing signal Sse and may control a time difference (for example, delay time) between scan signals supplied to the sequentially arranged two first scan lines (for example, Si and Si+1) and/or the first driving frequency in response to the shape of the curve of the sensing signal Sse in the period in which the first mode is executed. In an exemplary embodiment, the delay time (or the first driving frequency) in accordance with the shape of the curve of the sensing signal Sse may be previously stored in the lookup table LUT and the delay time may be set in consideration of a human luminous characteristic, for example. In this case, the timing controller 250 may set the division scanning condition to be applied to the first mode in accordance with the delay time corresponding to the shape of the curve of the sensing signal Sse.

According to an exemplary embodiment, the sensing mode may be executed at least once before forwarding the display device. In this case, initial characteristic information of the display panel to which a process deviation is reflected is stored before forwarding the display device and an initial division scanning condition of the first mode may be set so that it is possible to prevent picture quality from deteriorating during the low frequency driving like in the first mode by the initial characteristic information. In addition, the sensing mode may be executed every predetermined period or whenever a predetermined condition is satisfied even after the display device is used. In an exemplary embodiment, the sensing mode may be executed every predetermined period corresponding to an amount of use (or use time) of the display device or every point of time of a change in a driving mode, for example. In an exemplary embodiment, when the driving mode of the display device is changed from the second mode to the first mode, after the sensing mode is previously executed so that the division scanning condition in the first mode is reset, the first mode may be executed, for example. As described above, when the division scanning condition to be applied to the first mode is reset by executing the sensing mode even after the display device is used, a change in characteristic of the display panel in accordance with a use environment (for example, temperature or humidity) of the display device is reflected so that it is possible to effectively prevent picture quality from deteriorating in the first mode.

As described above, according to the exemplary embodiment of the invention, power consumption is reduced by low speed driving the display device at a minimum frequency in the first mode in which high frequency driving is not desired such as a standby mode (a low frequency mode in which the display device is driven at lower frequency than in a common display mode). In addition, according to the exemplary embodiment of the invention, flicker that may increase during the low frequency driving is dispersed by driving the display region, that is, the first pixel region 101 in the division scanning method in response to the first mode so that it is possible to prevent picture quality from deteriorating.

In addition, according to the exemplary embodiment of the invention, the display device is driven in the sensing mode in the predetermined sensing period. Specifically, according to the exemplary embodiment of the invention, the current that flows through at least one second pixel PXL2 structured to be the same as or similar to the first pixels PXL1 is sensed in the period in which the sensing mode is executed and the characteristic of the display device is detected by the sensed current. Then, it is possible to effectively prevent picture quality from deteriorating in the first mode by controlling the division scanning condition applied to the first mode in response to the detected characteristic of the display device.

Figure 2:
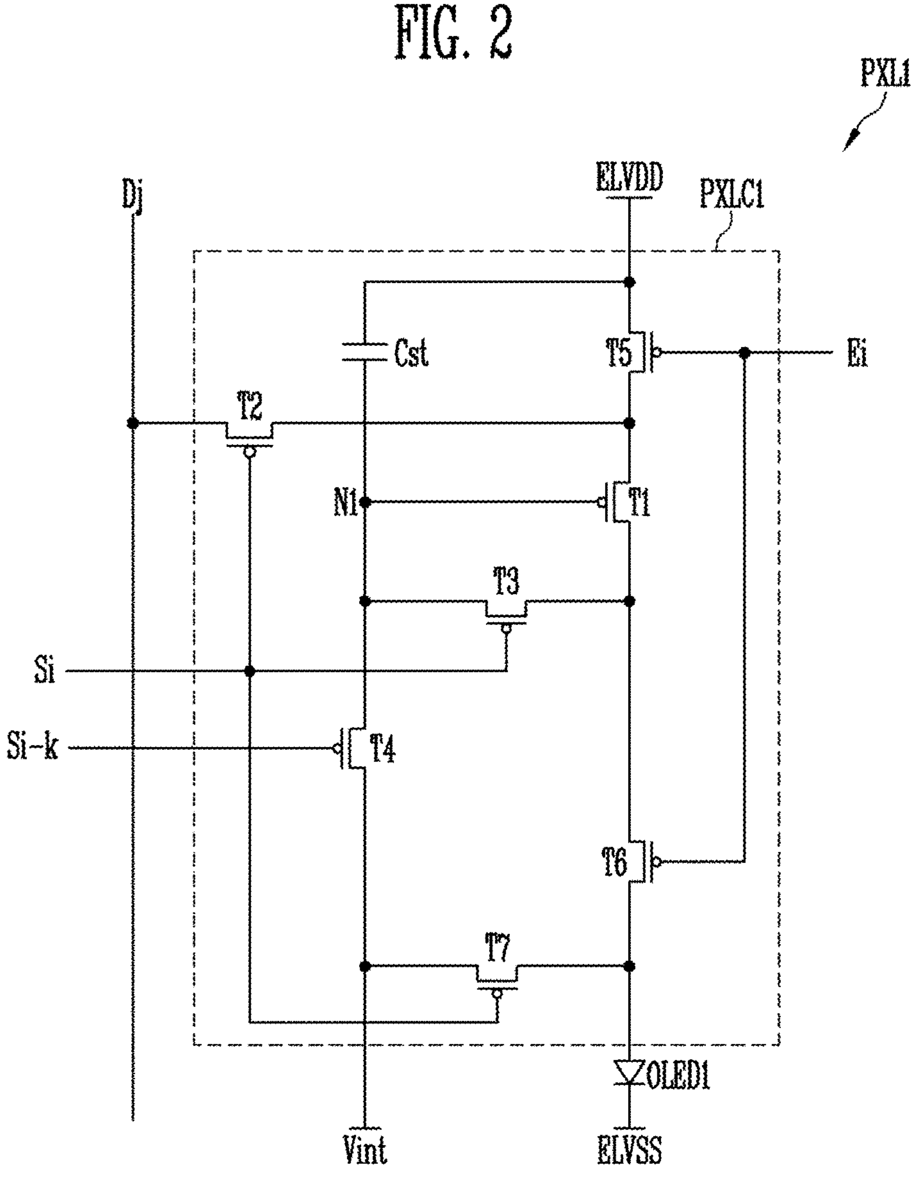
FIG. 2 is a view illustrating an exemplary embodiment of the first pixel of FIG. 1.

FIG. 2 is a view illustrating an exemplary embodiment of the first pixel of FIG. 1. According to the exemplary embodiment of the invention, the first pixels PXL1 provided in the first pixel region 101 may have the same structure. For convenience sake, in FIG. 2, a first pixel PXL1 positioned in an ith pixel row and a jth pixel column will be illustrated.

Referring to FIG. 2, the first pixel PXL1 according to the exemplary embodiment of the invention includes a first pixel circuit PXLC1 connected to at least an ith first scan line Si (that is, a current scan line) and a corresponding data line Dj and a first organic light emitting diode ("OLED") OLED1 connected to the first pixel circuit PXLC1. In addition, according to an exemplary embodiment, the first pixel PXL1 may be further connected to one of previous scan lines, for example, an (i-k)th first scan line Si-k and the ith first emission control line Ei. According to an exemplary embodiment, k may be a natural number equal to or greater than 1, for example, a natural number equal to or greater than 2 in consideration of the division scanning condition in accordance with the first mode.

An anode electrode of the first OLED OLED1 is connected to the first pixel circuit PXLC1 and a cathode electrode thereof is connected to a second power source ELVSS. The first OLED OLED1 emits light with brightness corresponding to an amount of driving current supplied from the first pixel circuit PXLC1.

The first pixel circuit PXLC1 controls the amount of the driving current that flows from a first power source ELVDD to the second power source ELVSS via the first OLED OLED1 in response to a data signal. Here, a voltage of the first power source ELVDD may be set to be higher than that of the second power source ELVSS.

According to an exemplary embodiment, the first pixel circuit PXLC1 may include a first transistor T1, a second transistor T2, a third transistor T3, a fourth transistor T4, a fifth transistor T5, a sixth transistor T6, a seventh transistor T7, and a storage capacitor Cst.

The seventh transistor T7 is connected between an initializing power source Vint and the anode electrode of the first OLED OLED1. A gate electrode of the seventh transistor T7 is connected to the ith first scan line Si. The seventh transistor T7 is turned on when a scan signal of a gate on voltage (e.g., low voltage) is supplied to the ith first scan line Si and supplies a voltage of the initializing power source Vint to the anode electrode of the first OLED OLED1. Here, the initializing power source Vint may be set to be equal to or less than the lowest voltage of the data signal.

The sixth transistor T6 is connected between the first transistor T1 and the first OLED OLED1. A gate electrode of the sixth transistor T6 is connected to the ith first emission control line Ei. The sixth transistor T6 is turned off when an emission control signal of a gate off voltage (e.g., high voltage) is supplied to the ith first emission control line Ei and is turned on in the other cases.

The fifth transistor T5 is connected between the first power source ELVDD and the first transistor T1. A gate electrode of the fifth transistor T5 is connected to the ith first emission control line Ei. The fifth transistor T5 is turned off when the emission control signal of the gate off voltage is supplied to the ith first emission control line Ei and is turned on in the other cases.

A first electrode of the first transistor T1 (a driving transistor) is connected to the first power source ELVDD via the fifth transistor T5 and a second electrode thereof is connected to the anode electrode of the first OLED OLED1 via the sixth transistor T6. A gate electrode of the first transistor T1 is connected to a first node N1. The first transistor T1 controls the driving current that flows from the first power source ELVDD to the second power source ELVSS via the first OLED OLED1 in response to a voltage of the first node N1.

The third transistor T3 is connected between the second electrode of the first transistor T1 and the first node N1. A gate electrode of the third transistor T3 is connected to the ith first scan line Si. The third transistor T3 is turned on when a scan signal is supplied to the ith first scan line Si and electrically connects the second electrode of the first transistor T1 and the first node N1. That is, when the third transistor T3 is turned on, the first transistor T1 is diode-connected.

The fourth transistor T4 is connected between the first node N1 and the initializing power source Vint. A gate electrode of the fourth transistor T4 is connected to the (i-k)th first scan line Si-k. The fourth transistor T4 is turned on when a scan signal is supplied to the (i-k)th first scan line Si-k and supplies the voltage of the initializing power source Vint to the first node N1.

The second transistor T2 is connected between the data line Dj and the first electrode of the first transistor T1. A gate electrode of the second transistor T2 is connected to the ith first scan line Si. The second transistor T2 is turned on when the scan signal is supplied to the ith first scan line Si and electrically connects the data line Dj and the first electrode of the first transistor T1.

The storage capacitor Cst is connected between the first power source ELVDD and the first node N1. The storage capacitor Cst stores the data signal and a voltage corresponding to a threshold voltage of the first transistor T1.

Figure 3:
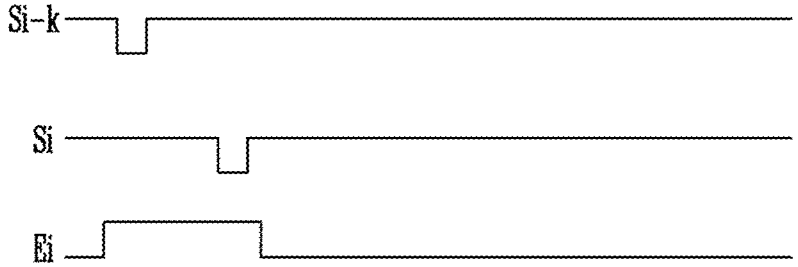
FIG. 3 is a view illustrating an exemplary embodiment of a method of driving the first pixel of FIG. 2.

FIG. 3 is a view illustrating an exemplary embodiment of a method of driving the first pixel of FIG. 2.

Referring to FIG. 3, the emission control signal of the gate off voltage is supplied to the ith first emission control line Ei. Therefore, the fifth transistor T5 and the sixth transistor T6 are turned off so that the first pixel PXL1 is set to be in a non-emission state. According to an exemplary embodiment, a gate off voltage period of the ith first emission control line Ei may be set to overlap gate on voltage periods of the (i-k)th first scan line Si-k and the ith first scan line Si.

After a supply of the emission control signal starts, when a scan signal of a gate on voltage is supplied to the (i-k)th first scan line Si-k, the fourth transistor T4 is turned on. When the fourth transistor T4 is turned on, the voltage of the initializing power source Vint is supplied to the first node N1. Therefore, the first node N1 is initialized to the voltage of the initializing power source Vint.

After the first node N1 is initialized to the voltage of the initializing power source Vint, the scan signal is supplied to the ith first scan line Si. When the scan signal is supplied to the ith first scan line Si, the second transistor T2, the third transistor T3, and the seventh transistor T7 are turned on.

When the seventh transistor T7 is turned on, the voltage of the initializing power source Vint is supplied to the anode electrode of the first OLED OLED1. Then, a parasitic capacitor generated in the first OLED OLED1 is discharged so that ability to display the black grayscale may increase.

When the third transistor T3 is turned on, the first transistor T1 is diode-connected.

When the second transistor T2 is turned on, the data signal from the data line Dj is supplied to the first electrode of the first transistor T1. At this time, since the first node N1 is initialized to the voltage of the initializing power source Vint lower than the data signal, the first transistor T1 is turned on. When the first transistor T1 is turned on, a voltage obtained by subtracting the threshold voltage of the first transistor T1 from the data signal is applied to the first node N1. The storage capacitor Cst stores the data signal and the voltage corresponding to the threshold voltage of the first transistor T1 that are applied to the first node N1.

After the data signal and the voltage corresponding to the threshold voltage of the first transistor T1 are stored in the storage capacitor Cst, supply of the emission control signal of the gate off voltage stops. When the supply of the emission control signal of the gate off voltage stops, the gate on voltage may be applied to the ith first emission control line Ei.

When the gate on voltage may be applied to the ith first emission control line Ei, the fifth transistor T5 and the sixth transistor T6 are turned on. Then, a current path is generated from the first power source ELVDD to the second power source ELVSS via the fifth transistor T5, the first transistor T1, the sixth transistor T6, and the first OLED OLED1. At this time, the first transistor T1 controls the amount of the driving current that flows from the first power source ELVDD to the second power source ELVSS via the first OLED OLED1 in response to the voltage of the first node N1. Then, the first OLED OLED1 emits the light with the brightness corresponding to the amount of the driving current supplied from the first transistor T1.

The first pixel PXL1 generates the light with the brightness corresponding to the data signal while repeating the above-described processes every frame period. In addition, according to the exemplary embodiment of the invention, the circuit structure of the first pixel PXL1 is not limited to that illustrated in the exemplary embodiment of FIG. 2. In an exemplary embodiment, the first pixel PXL1 may have currently known various shapes, for example.

Figure 4A:
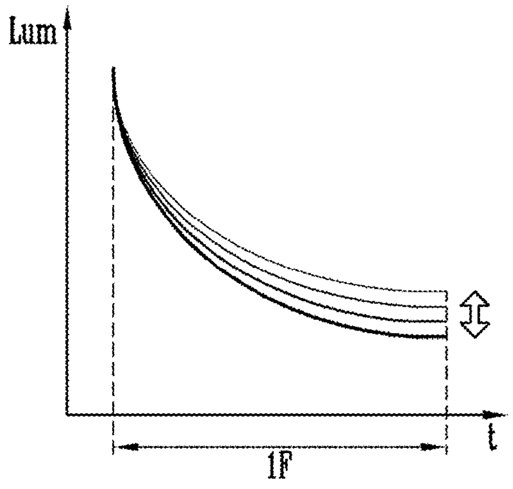
FIGS. 4A and 4B are views illustrating an example of a brightness change that may occur in a first pixel in each frame period.
Figure 4B:
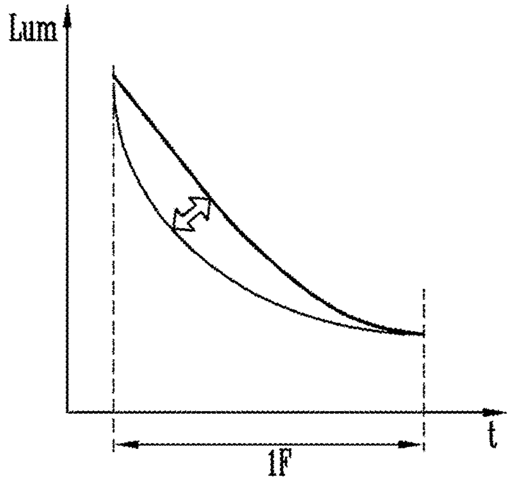

FIGS. 4A and 4B are views illustrating an example of a change in brightness that may occur in a first pixel in each frame period. In each frame period, a period in which the first pixel PXL1 is initialized and a period in which the data signal is input to the first pixel PXL1 may be much shorter than an emission period. Therefore, for convenience sake, in FIGS. 4A and 4B, in each frame period, a period in which the first pixel PXL1 emits light is illustrated as a one frame period 1F. In addition, in FIGS. 4A and 4B, a reference character Lum may denote brightness and a reference character t may denote time.

Referring to FIGS. 4A and 4B, in each frame period, the brightness of the first pixel PXL1 may gradually change with the lapse of time. Specifically, the first pixel PXL1 ideally emits light with uniform brightness in each frame period. Actually, a change in brightness may occur in the first pixel PXL1 due to leakage current generated in the first pixel PXL1 or hysteresis of the first transistor T1. In an exemplary embodiment, in each frame period, with the lapse of time, the brightness of the first pixel PXL1 may gradually deteriorate, for example.

In accordance with a characteristic of the first pixel PXL1 and/or a use environment of the display device, as illustrated in FIG. 4A, an amount of deterioration of the brightness of the first pixel PXL1 may vary. In addition, in accordance with the characteristic of the first pixel PXL1 and/or the use environment of the display device, as illustrated in FIG. 4A, the amount of deterioration of the brightness of the first pixel PXL1 may vary. In addition, in accordance with the characteristic of the first pixel PXL1 and/or the use environment of the display device, as illustrated in FIG. 4B, a brightness curve of the first pixel PXL1 may vary.

The change in brightness of the first pixel PXL1 increases with the lapse of time. Therefore, when the display device is driven at low speed in response to the first mode, continuation time of the one frame period 1F increases so that the change in brightness of the first pixel PXL1 remarkably increases. In particular, when it is assumed that the sequential driving method is applied in a state in which the display device is driven at low speed, the change in brightness remarkably increases in adjacent pixel rows at the same point of time or at a similar point of time so that flicker may be remarkably recognized.

Figure 5:
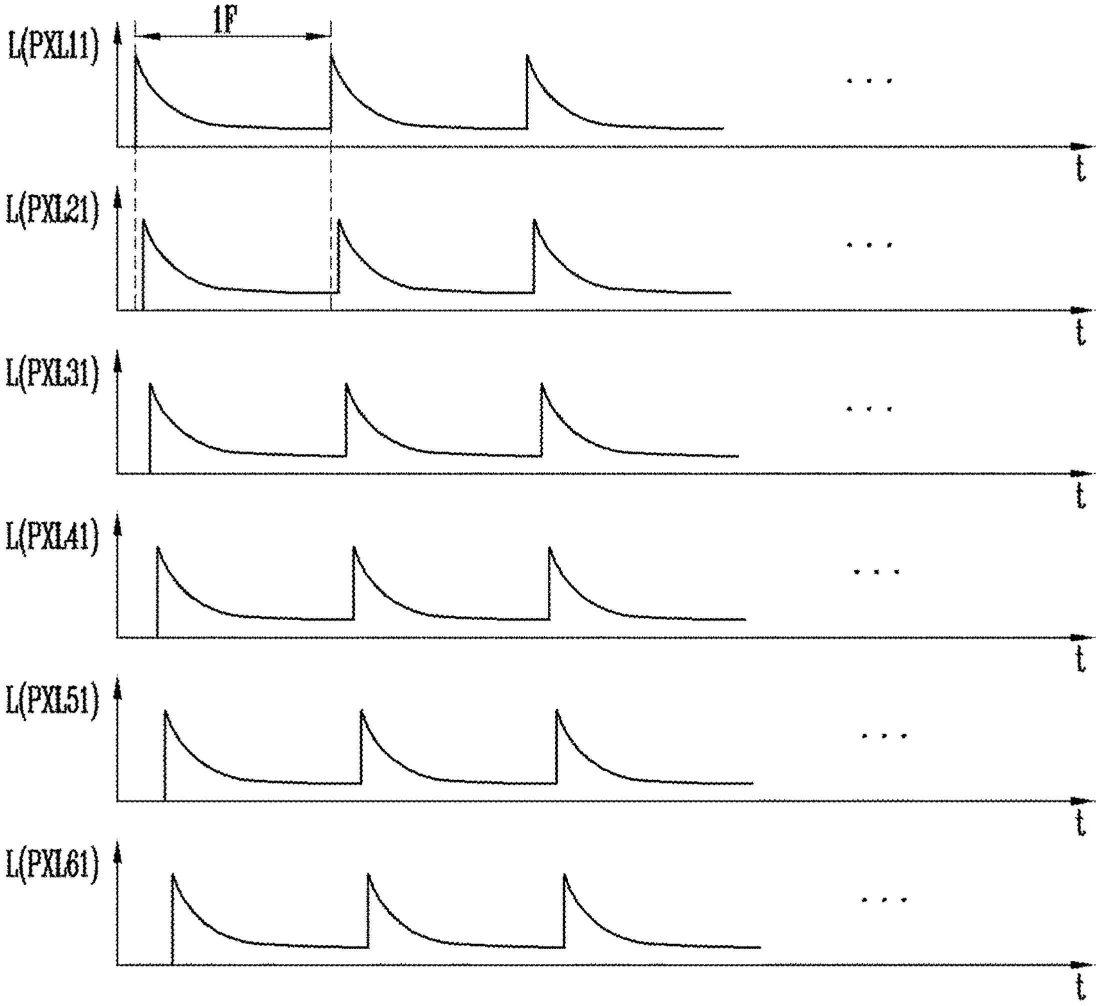
FIG. 5 is a view illustrating a change in brightness that occurs in each pixel row of a first pixel region in a comparative embodiment.

FIG. 5 is a view illustrating a change in brightness that occurs in each pixel row of a first pixel region in a comparative embodiment. According to the comparative embodiment, in a period in which the first mode is executed, the first scan lines S1 through Sn are driven in the sequential driving method. In FIG. 5, a reference character L(PXLij) may denote brightness of the first pixel PXLij arranged in the ith row and the jth column of the first pixel region 101. In an exemplary embodiment, a reference character L(PXL11) may denote brightness of a first pixel PXL11 arranged in a first row and a first column of the first pixel region 101, for example.

Referring to FIG. 5, when the display device is driven at low speed in the sequential driving method in response to the first mode, a change in brightness remarkably increases in first pixels PXL1 arranged to be adjacent to each other in sequential pixel rows, for example, first pixels PXL11, PXL12, . . . arranged to be adjacent to each other in a first column of the respective pixel rows at the same point of time or at a similar point of time (for example, at an emission start point of time of each frame period) so that flicker may be remarkably recognized. Therefore, in the display device according to the comparative embodiment, there may be limitations on reducing a driving frequency even in the first mode.

Figure 6:
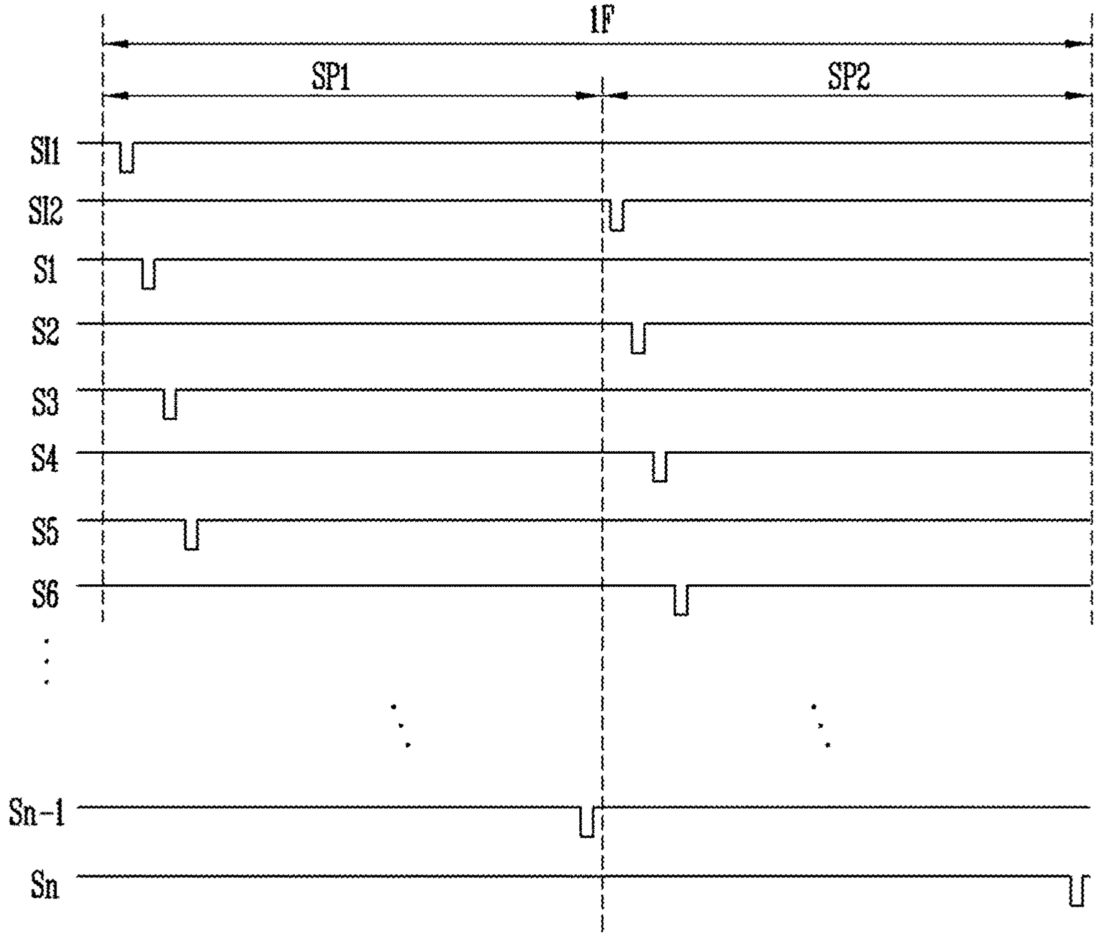
FIG. 6 is a view illustrating an exemplary embodiment of a method of driving first scan lines when a display device according to an exemplary embodiment of the invention is driven in a first mode.
Figure 7:
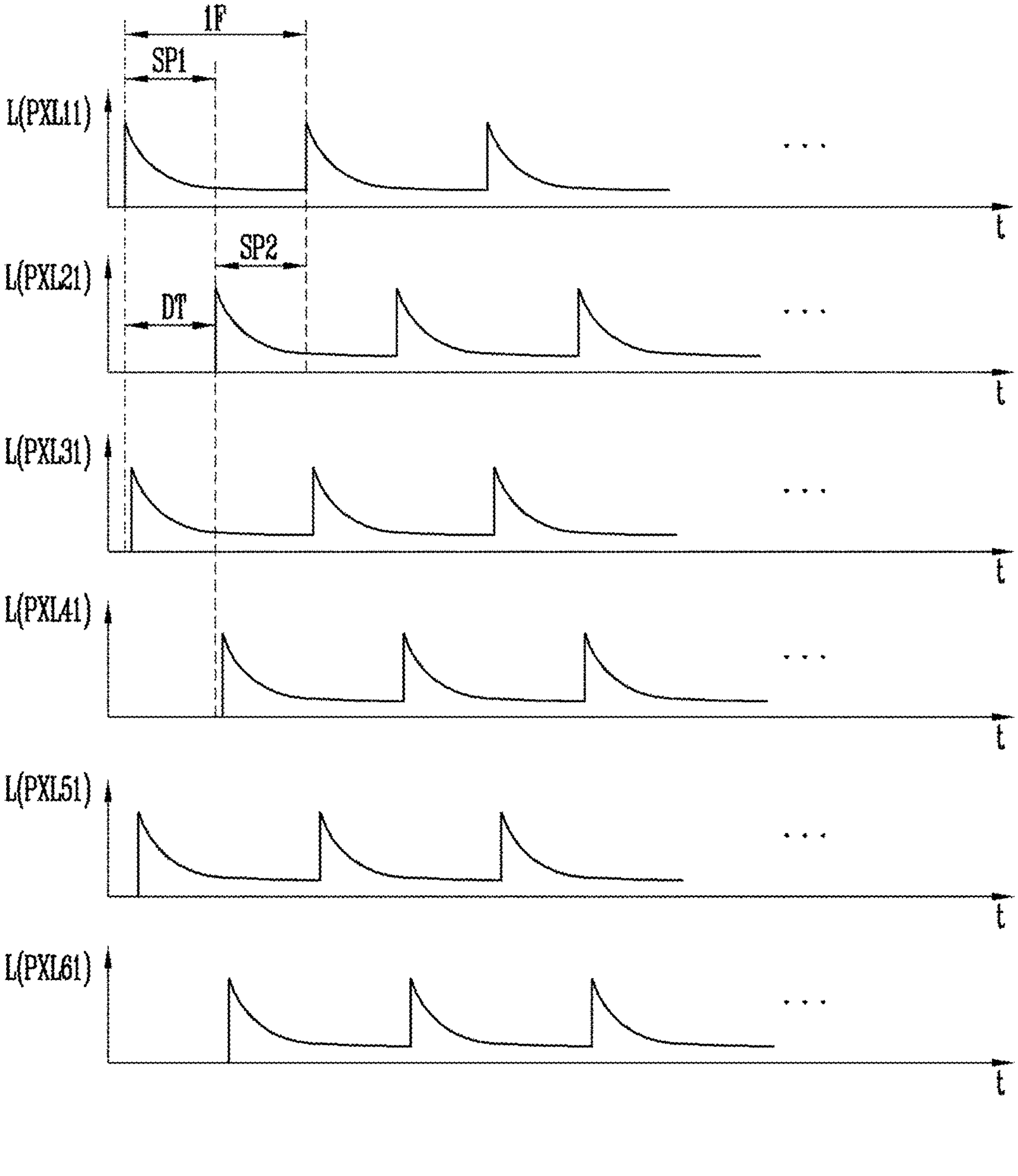
FIG. 7 is a view illustrating a change in brightness that occurs in each pixel row of a first pixel region when first scan lines are driven according to the exemplary embodiment of FIG. 6.

FIG. 6 is a view illustrating an exemplary embodiment of a method of driving first scan lines when a display device according to an exemplary embodiment of the invention is driven in a first mode. FIG. 7 is a view illustrating a change in brightness that occurs in each pixel row of a first pixel region when first scan lines are driven according to the exemplary embodiment of FIG. 6.

Referring to FIG. 6, according to the exemplary embodiment of the invention, in the period in which the first mode is executed, the first scan lines S1 through Sn are driving in the division scanning method. In an exemplary embodiment, one frame period 1F may be divided into a first sub-period SP1 and a second sub-period SP2, for example. According to an exemplary embodiment, in the first sub-period SP1, some of the first scan lines S1 through Sn are driven and, in the second sub-period SP2, the others of the first scan lines S1 through Sn may be driven. In an exemplary embodiment, the first scan lines S1 through Sn may be interlace scanned so that odd first scan lines S1, S3, S5, . . . are sequentially driven in the first sub-period SP1 and even first scan lines S2, S4, S6, . . . are sequentially driven in the second sub-period SP2, for example.

In addition, according to an exemplary embodiment, when the first pixels PXL1 are initialized by one or more previous scan signals, first and second initializing scan lines SI1 and SI2 may be provided in the first pixel region 101. According to an exemplary embodiment, first pixels PXL1 in a first row are initialized in response to a scan signal of a gate on voltage that is supplied to the first initializing scan line SI1 and first pixels PXL1 in a second row may be initialized in response to a scan signal of a gate on voltage that is supplied to the second initializing scan line SI2. According to an exemplary embodiment, the first initializing scan line SI1 receives a scan signal in the first sub-period SP1 before a first first scan line S1 receives a scan signal and the second initializing scan line SI2 receives a scan signal in the second sub-period SP2 before a second first scan line S2 receives a scan signal.

In addition, according to an exemplary embodiment, first pixels PXL1 in a third row are initialized in response to a scan signal of a gate on voltage that is supplied to the first first scan line S1 and first pixels PXL1 in a fourth row may be initialized in response to a scan signal of a gate on voltage that is supplied to a second first scan line S2. In the above-described method, in each frame period, the first pixels PXL1 may be stably driven. Initializing points of time of the first pixels PXL1 may vary according to an exemplary embodiment.

Referring to FIG. 7, as the first scan lines S1 through Sn are driven in the division scanning method in response to the first mode, emission start points of time of the first pixels PXL11, PXL21, . . . arranged to be adjacent to each other in sequential pixel rows are alternately arranged in the first and second sub-periods SP1 and SP2. Therefore, flicker may be effectively dispersed so that it is possible to prevent picture quality from deteriorating due to flicker even in the first mode.

In addition, as described in FIG. 1, according to the exemplary embodiment of the invention, in response to the shape of the curve of the sensing signal Sse output from the sensor unit 240 in the predetermined sensing period, the time difference (a time difference in supply point of time) between the scan signals supplied to the sequentially arranged two first scan lines (for example, Si and Si+1) and/or the first driving frequency may be controlled. Therefore, according to the exemplary embodiment of the invention, intervals among emission start points of time of the first pixels PXL11, PXL21, . . . arranged in two sequential pixel rows, that is, delay time DT may be controlled in response to the shape of the curve of the sensing signal Sse. According to the exemplary embodiment of the invention, the division scanning condition may be effectively controlled in consideration of various factors that affect picture quality such as a human luminous characteristic.

Figure 8:
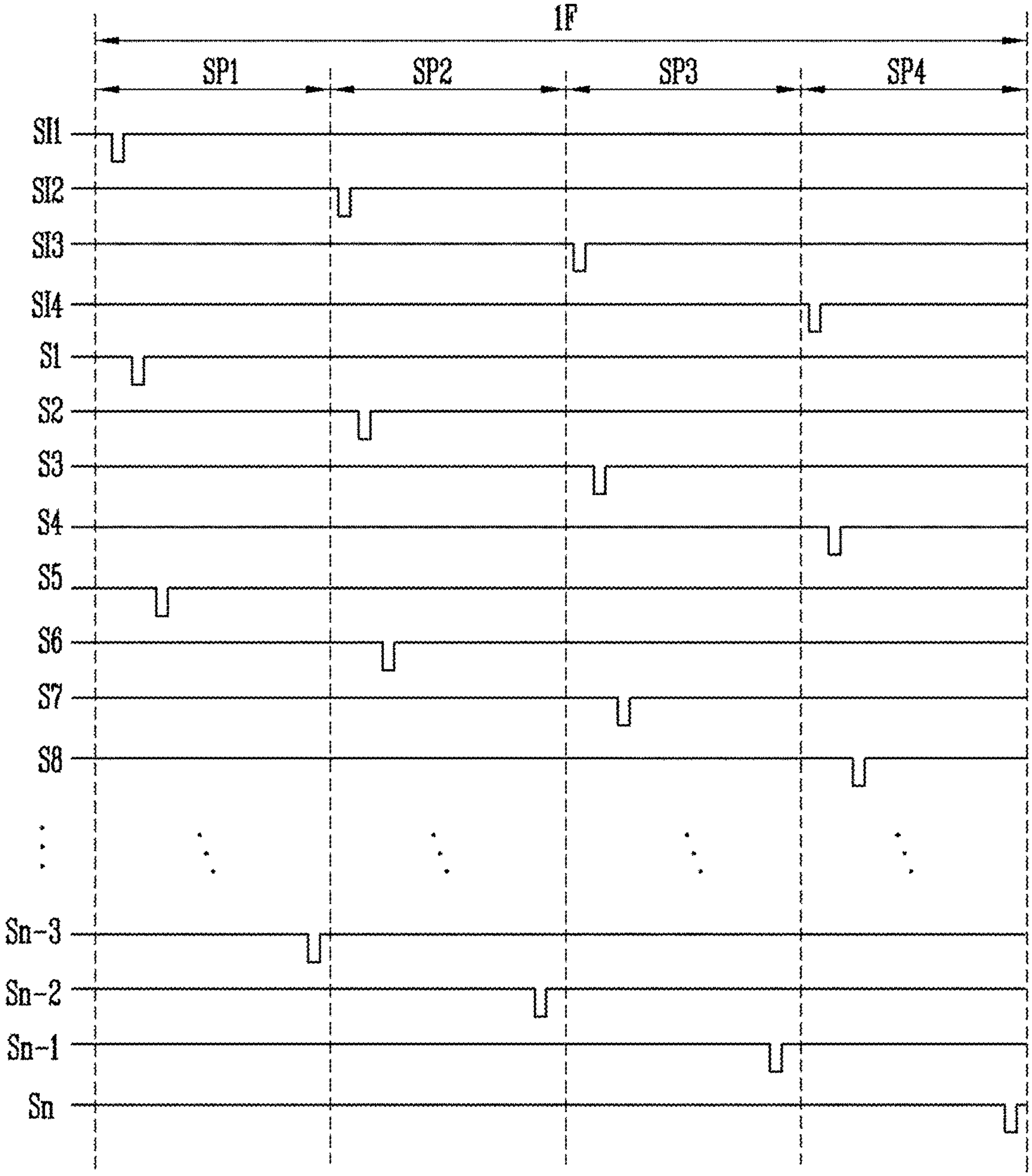
FIG. 8 is a view illustrating another exemplary embodiment of a method of driving first scan lines when a display device according to an exemplary embodiment of the invention is driven in a first mode.

FIG. 8 is a view illustrating another exemplary embodiment of a method of driving first scan lines when a display device according to an exemplary embodiment of the invention is driven in a first mode.

Referring to FIG. 8, one frame period 1F may be divided into a larger number of sub-periods than in the exemplary embodiment of FIG. 6, for example, first through fourth sub-periods SP1 through SP4. The first scan lines S1 through Sn may be divided into a larger number of groups than in the exemplary embodiment illustrated in FIG. 6, for example, four groups corresponding to the number of sub-periods SP1 through SP4 and, in each sub-period (one of SP1 through SP4), some of the first scan lines S1 through Sn may be sequentially driven.

In an exemplary embodiment, predetermined first scan lines S1, S5, . . . are sequentially driven at four scan line intervals from the first first scan line S1 in the first sub-period SP1 and predetermined first scan lines S2, S6, . . . may be sequentially driven at four scan line intervals from the second first scan line S2 in the second sub-period SP2, for example. Then, predetermined first scan lines S3, S7, . . . are sequentially driven at four scan line intervals from the third first scan line S3 in the third sub-period SP3 and predetermined first scan lines S4, S8, . . . may be sequentially driven at four scan line intervals from the fourth first scan line S4 in the fourth sub-period SP4.

In addition, according to an exemplary embodiment, when the first pixels PXL1 are initialized by one or more previous scan signals, first through fourth initializing scan lines SI1 through SI4 may be provided in the first pixel region 101. According to an exemplary embodiment, first pixels PXL1 of a first row are initialized in response to a scan signal of a gate on voltage that is supplied to the first initializing scan line SI1 and first pixels PXL1 of a second row may be initialized in response to the scan signal of the gate on voltage that is supplied to the second initializing scan line SI2. Then, first pixels PXL1 of a third row are initialized in response to a scan signal of a gate on voltage that is supplied to the third initializing scan line SI3 and first pixels PXL1 of a fourth row may be initialized in response to a scan signal of a gate on voltage that is supplied to the fourth initializing scan line SI4. According to an exemplary embodiment, the first initializing scan line SI1 receives a scan signal before the first first scan line S1 receives a scan signal in the first sub-period SP1 and the second initializing scan line SI2 may receive a scan signal before the second first scan line S2 receives a scan signal in the second sub-period SP2. Then, the third initializing scan line SI3 receives a scan signal before the third first scan line S3 receives a scan signal in the third sub-period SP3 and the fourth initializing scan line SI4 may receive a scan signal before the fourth first scan line S4 receives a scan signal in the fourth sub-period SP4.

In addition, according to an exemplary embodiment, first pixels PXL1 of a fifth row are initialized in response to the scan signal of the gate on voltage that is supplied to the first first scan line S1 and first pixels PXL1 of a sixth row may be initialized in response to the scan signal of the gate on voltage that is supplied to the second first scan line S2. Then, first pixels PXL1 of a seventh row are initialized in response to a scan signal of a gate on voltage that is supplied to the third first scan line S3 and first pixels PXL1 of an eighth row may be initialized in response to a scan signal of a gate on voltage that is supplied to the fourth first scan line S4. In the above-described method, in each frame period, the first pixels PXL1 may be stably driven. The initializing points of time of the first pixels PXL1 may vary according to embodiments.

The division scanning intervals of the first scan lines S1 through Sn are not limited to the exemplary embodiments illustrated in FIGS. 6 and 8 and may vary. In addition, according to the exemplary embodiment of the invention, a plurality of division scanning conditions in which the division scanning intervals among the first scan lines S1 through Sn are different is stored in the timing controller 250, and the division scanning intervals to be applied to the first mode may be set or changed in response to the amplitude of the sensing signal Sse output from the sensor unit 240 in the predetermined sensing period. According to an exemplary embodiment, when the first pixels PXL1 are initialized by one or more previous scan signals and the plurality of division scan intervals are stored in the timing controller 250, the initializing points of time of the first pixels PXL1 may be set in consideration of the plurality of division scan intervals. When the two division scanning intervals according to the exemplary embodiments of FIGS. 6 and 8 are stored in the timing controller 250, the first through fourth initializing scan lines SI1 through SI4 are provided in the first pixel region 101 and first pixels PXL1 of an ith row may be designed to be initialized by an (i-4)th initializing scan line (or one of the first through fourth initializing scan lines SI1 through SI4), for example.

As described above, when the one frame period 1F is divided into a larger number of sub-periods (for example, the first through fourth sub-periods SP1 through SP4) and the first scan lines S1 through Sn are dividedly scanned in accordance with the sub-periods, although the amplitude of the sensing signal Sse is large, the dispersing of flicker may be refined in the entire first pixel region 101. Therefore, it is possible to effectively prevent picture quality from deteriorating due to low speed driving.

As described above, according to the exemplary embodiment of the invention, the characteristic or the use environment of the display panel is detected by sensing current that flows through the display panel (for example, the dummy pixel row DPXL of the second pixel region 102) in the predetermined sensing period and the division scanning condition may be controlled in response to the characteristic or the use environment of the display panel. According to the exemplary embodiment of the invention, it is possible to reduce power consumption by driving the display device at low speed in the period in which the first mode is executed and to effectively prevent picture quality from deteriorating in the first mode.

Figure 9:
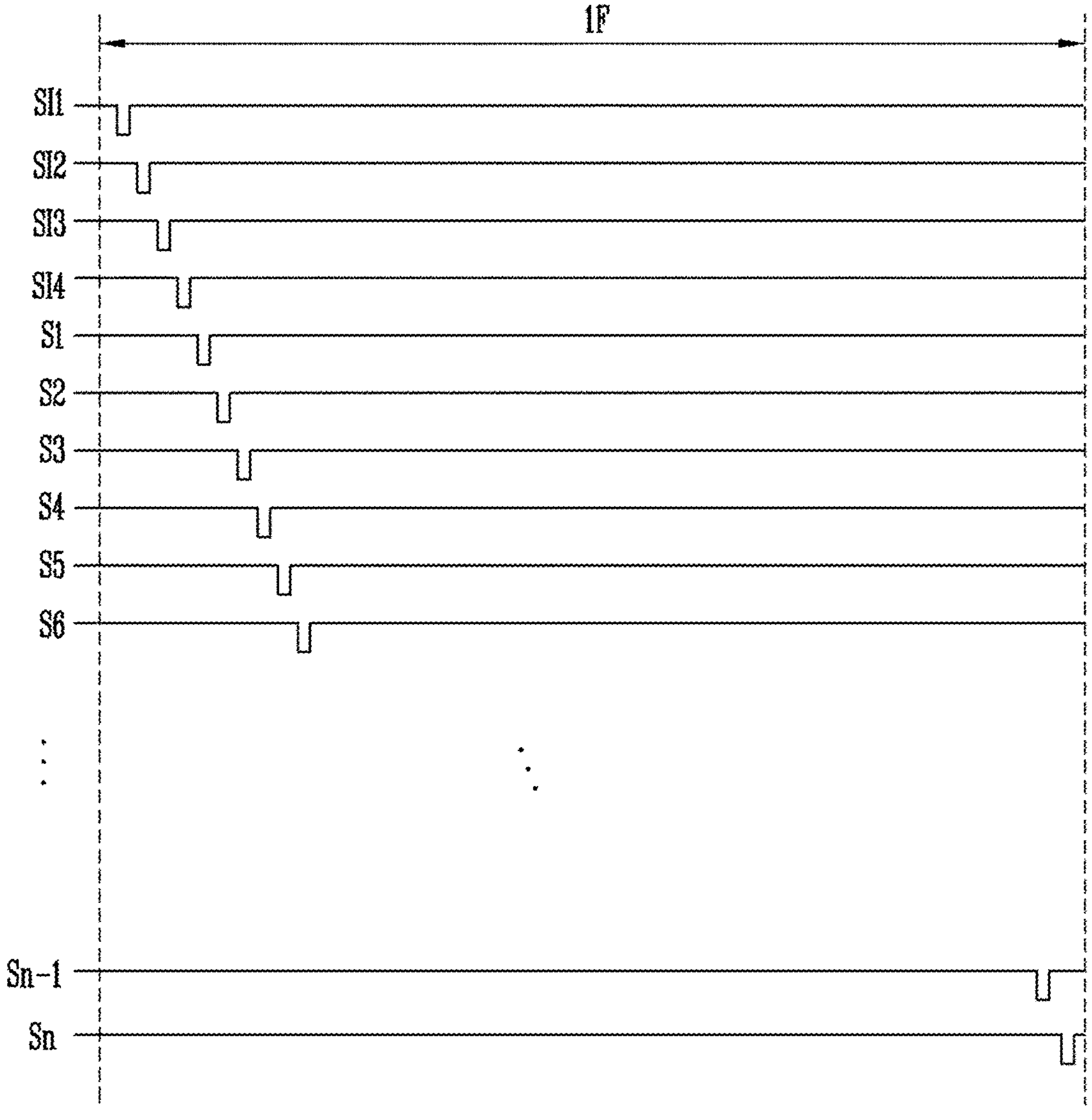
FIG. 9 is a view illustrating an exemplary embodiment of a method of driving first scan lines when a display device according to an exemplary embodiment of the invention is driven in a second mode.

FIG. 9 is a view illustrating an exemplary embodiment of a method of driving first scan lines when a display device according to an exemplary embodiment of the invention is driven in a second mode. For convenience sake, in FIG. 9, it is illustrated that the first through fourth initializing scan lines SI1 through SI4 are provided in the first pixel region 101. However, the number and/or presence of the initializing scan lines SD through SI4 may vary in accordance with embodiments.

Referring to FIG. 9, according to the exemplary embodiment of the invention, in the period in which the second mode is executed, the first scan lines S1 through Sn may be driven in the sequential scanning method. In an exemplary embodiment, the timing controller 250 may control the scan driver 210 so that scan signals are sequentially supplied to the first through fourth initializing scan lines SI1 through SI4 and the first scan lines S1 through Sn of first through last rows in response to the second mode, for example.

Figure 10:
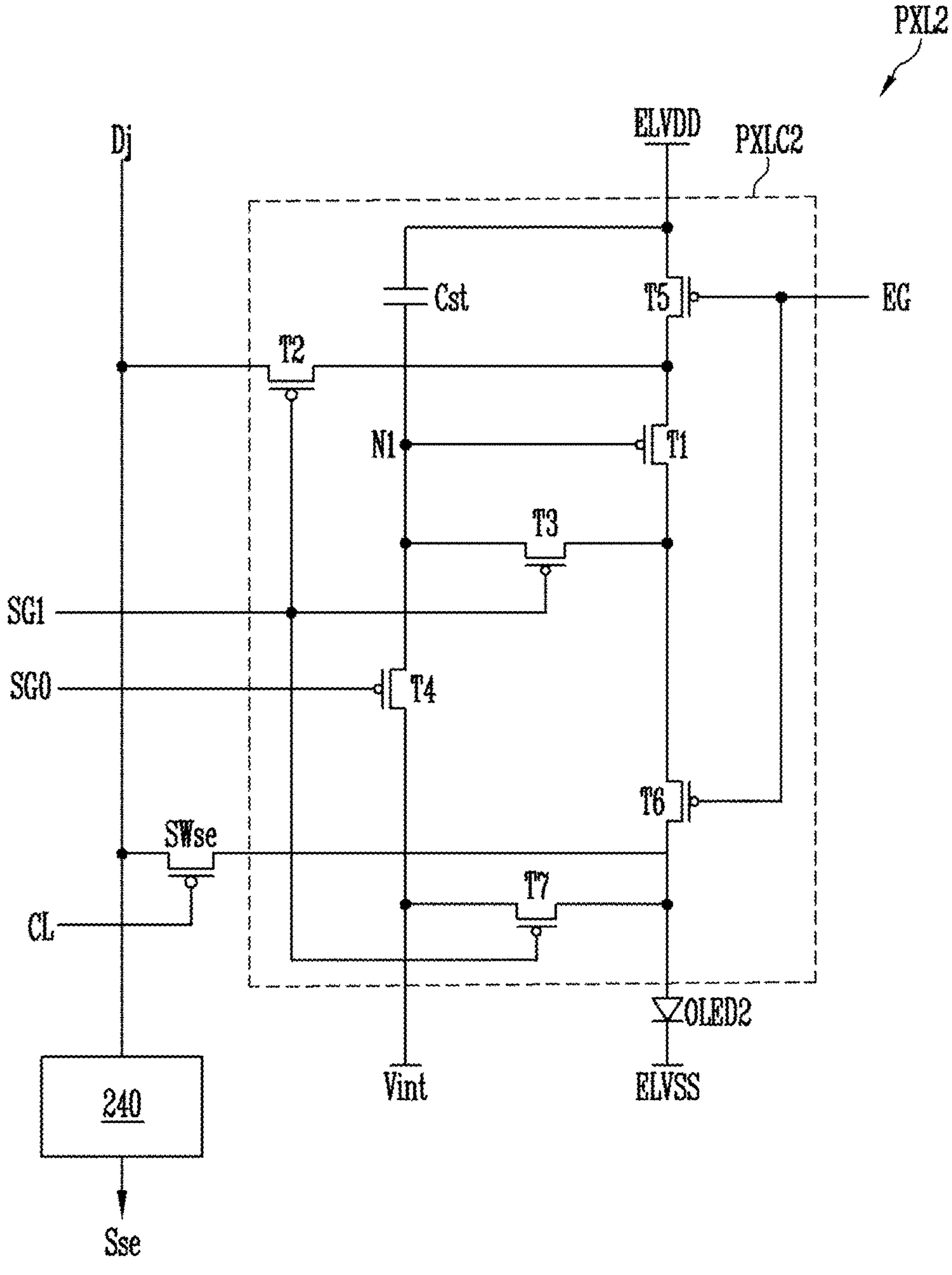
FIG. 10 is a view illustrating an exemplary embodiment of the second pixel of FIG. 1.

FIG. 10 is a view illustrating an exemplary embodiment of the second pixel of FIG. 1. In FIG. 10, elements the same as or similar to those of FIG. 2 are denoted by the same reference numerals and detailed description thereof will not be given.

Referring to FIG. 10, the second pixel PXL2 according to the exemplary embodiment of the invention may include a second pixel circuit PXLC2 and a second OLED OLED2 connected to the second pixel circuit PXLC2. In addition, the second pixel PXL2 may further include a switching element SWse for controlling a connection to the sensor unit 240.

According to an exemplary embodiment, the second pixel circuit PXLC2 has the same structure as that of the above-described first pixel circuit PXLC1 of the first pixel PXL1 and driving timing of the second pixel circuit PXLC2 may be different from that of the first pixel circuit PXLC1. In an exemplary embodiment, while the first pixel circuit PXLC1 is driven in the period in which the display device is driven in the first and second modes, the second pixel circuit PXLC2 may be driven in the predetermined sensing period in which the display device is driven in the sensing mode, for example.

For this purpose, the second pixel circuit PXLC2 may be connected to a second scan line SG1, a sensing initializing scan line SG0, a predetermined data line Dj, and a second emission control line EG. The second scan line SG1, the sensing initializing scan line SG0, and the second emission control line EG receive scan signals and an emission control signal of gate on voltages in the respective sensing periods and may maintain gate off voltages in the other period (for example, in the period in which the display device is driven in the first and second modes).

According to an exemplary embodiment, the gate electrodes of the second, third, and seventh transistors T2, T3, and T7 are connected to the second scan line SG1 and the gate electrode of the fourth transistor T4 may be connected to the sensing initializing scan line SG0. In addition, the gate electrodes of the fifth and sixth transistors T5 and T6 may be connected to the second emission control line EG.

Since the remaining structure of the second pixel circuit PXLC2 is the same as that of the above-described first pixel circuit PXLC1, detailed description thereof will not be given.

According to an exemplary embodiment, a control electrode of the switching element SWse is connected to the control line CL. A first electrode of the switching element SWse is connected to the second pixel circuit PXLC2 and the second OLED OLED2 and a second electrode thereof is connected to the sensor unit 240 through the data line Dj of the second pixel PXL2. According to another exemplary embodiment, the second electrode of the switching element SWse may be connected to the sensor unit 240 through a sensing line separate from the data line Dj. The switching element SWse is turned on when a control signal of a gate on voltage is supplied to the control line CL and electrically connects the second pixel PXL2 and the sensor unit 240.

Figure 11:
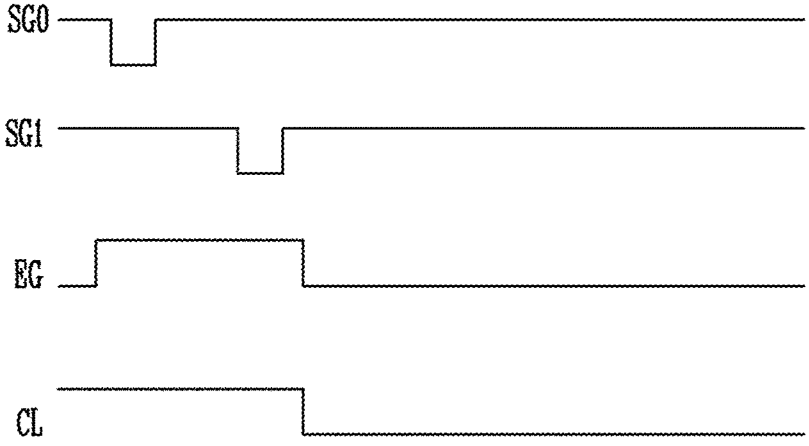
FIG. 11 is a view illustrating an exemplary embodiment of a method of driving the second pixel of FIG. 10.

FIG. 11 is a view illustrating an exemplary embodiment of a method of driving the second pixel of FIG. 10. Specifically, FIG. 11 illustrates an example of input signals supplied to the second pixel PXL2 in the predetermined sensing period. The input signals may be supplied to the second pixel PXL2 in the respective sensing period. That is, the second pixel PXL2 may be driven every predetermined sensing period and may maintain an off state in the other period.

Referring to FIG. 11, the emission control signal of the gate off voltage is supplied to the second emission control line EG. Therefore, the fifth transistor T5 and the sixth transistor T6 are turned off so that the second pixel PXL2 is set to be in a non-emission state. According to an exemplary embodiment, a gate off voltage period of the second emission control line EG may be set to overlap gate on voltage periods of the sensing initializing scan line SG0 and the second scan line SG1.

After a supply of the emission control signal starts, when a scan signal of a gate on voltage is supplied to the sensing initializing scan line SG0, the fourth transistor T4 is turned on. When the fourth transistor T4 is turned on, a voltage of the initializing power source Vint is supplied to the first node N1. Then, the first node N1 is initialized to the voltage of the initializing power source Vint.

After the first node N1 is initialized to the voltage of the initializing power source Vint, the scan signal is supplied to the second scan line SG1. When the scan signal is supplied to the second scan line SG1, the second transistor T2, the third transistor T3, and the seventh transistor T7 are turned on.

When the seventh transistor T7 is turned on, the voltage of the initializing power source Vint is supplied to an anode electrode of the second OLED OLED2. Then, the anode electrode of the second OLED OLED2 is initialized.

When the third transistor T3 is turned on, the first transistor T1 is diode-connected.

When the second transistor T2 is turned on, a sensing data signal from the data line Dj is supplied to the first electrode of the first transistor T1. At this time, since the first node N1 is initialized to the voltage of the initializing power source Vint lower than the sensing data signal, the first transistor T1 is turned on. When the first transistor T1 is turned on, a voltage obtained by subtracting a threshold voltage of the first transistor T1 from the sensing data signal is applied to the first node N1. The storage capacitor Cst stores the sensing data signal applied to the first node N1 and the voltage corresponding to the threshold voltage of the first transistor T1.

After the sensing data signal and the voltage corresponding to the threshold voltage of the first transistor T1 are stored in the storage capacitor Cst, supply of the emission control signal of the gate off voltage is stopped. When the supply of the emission control signal of the gate off voltage is stopped, a gate on voltage may be applied to the second emission control line EG.

When the gate on voltage is applied to the second emission control line EG, the fifth transistor T5 and the sixth transistor T6 are turned on. Then, a current path is generated from the first power source ELVDD to the second power source ELVSS via the fifth transistor T5, the first transistor T1, the sixth transistor T6, and the second OLED OLED2. At this time, the first transistor T1 controls an amount of driving current that flows from the first power source ELVDD to the second power source ELVSS via the second OLED OLED2 in response to the voltage of the first node N1. Then, the second OLED OLED2 emits light with brightness corresponding to the amount of the driving current supplied from the first transistor T1.

In a period in which the second OLED OLED2 emits light, the control signal of the gate on voltage may be supplied to the control line CL. That is, the scan signals of the gate on voltages are sequentially supplied to the sensing initializing scan line SG0 and the second scan line SG1 in an initial period (a first period) of the sensing period and the control signal of the gate on voltage may be supplied to the control line CL in an emission period (a second period) subsequent to the initial period.

When the control signal of the gate on voltage is supplied, the switching element SWse is turned on. Therefore, the second pixel PXL2 is connected to the sensor unit 240 so that current that flows through the second pixel PXL2 is input to the sensor unit 240. Then, the sensor unit 240 outputs the sensing signal Sse corresponding to the current that flows through the second pixel PXL2.

According to an exemplary embodiment, in the sensing period, the second pixel PXL2 may be driven in the same condition as a condition in which each first pixel PXL1 (refer to FIGS. 1 and 2) is driven in the first mode. In an exemplary embodiment, one frame period of the sensing period may be set to have the same continuation time as one frame period in the first mode, for example. In addition, the second pixel PXL2 has the same structure as that of the first pixels PXL1 excluding the switching element SWse and is disposed on the display panel with the first pixels PXL1 in the same process. Therefore, the second pixel PXL2 may have a characteristic the same as or similar to each first pixel PXL1.

That is, in the predetermined sensing period, when the second pixel PXL2 is driving in the same condition as the first mode and current is measured, the current that flows through the first pixels PXL1 in the first mode may be estimated. Therefore, a brightness characteristic of the first pixels PXL1 in the first mode may be estimated and the division scanning condition in the first mode may be controlled in accordance with the brightness characteristic.

Figure 12:
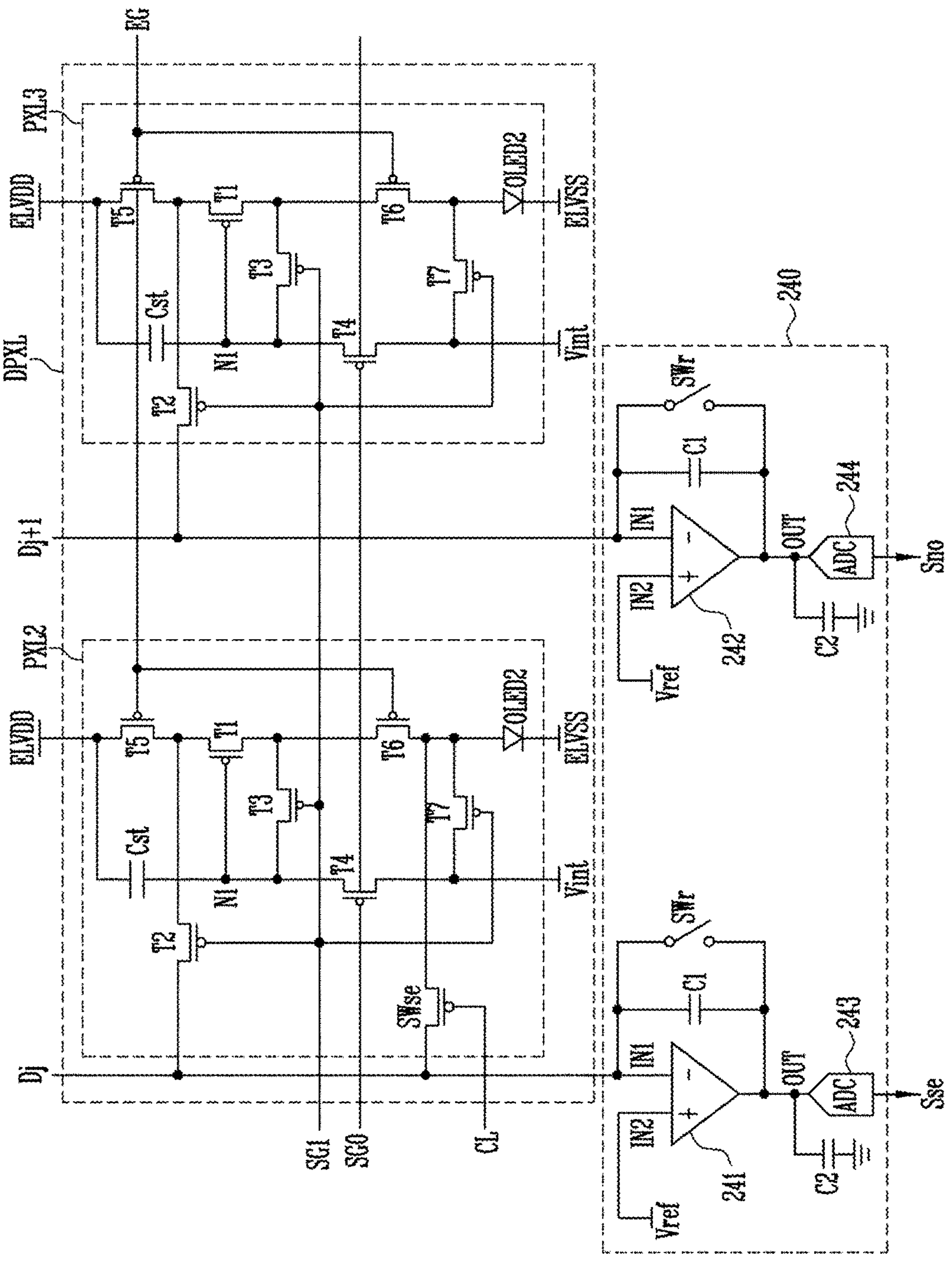
FIG. 12 is a view illustrating an exemplary embodiment of the dummy pixel row and the sensor unit of FIG. 1.

FIG. 12 is a view illustrating an exemplary embodiment of the dummy pixel row and the sensor unit of FIG. 1.

Referring to FIG. 12, according to an exemplary embodiment, the dummy pixel row DPXL may further include at least one third pixel PXL3. The third pixel PXL3 is connected to the second scan line SG1, the sensing initializing scan line SG0, and the second emission control line EG like the second pixel PXL2 and is also connected to a predetermined data line Dj+1. The third pixel PXL3 has the same structure as that of the second pixel PXL2 excluding the switching element SWse. In an exemplary embodiment, the third pixel PXL3 may not include the switching element SWse, for example. Therefore, in the period in which the current of the second pixel XPL2 is sensed, the third pixel XPL3 is not connected to the sensor unit 240.

According to an exemplary embodiment, the sensor unit 240 may include a first amplifier 241 connected to the second pixel PXL2 through the data line Dj of the second pixel PXL2 (or an additional sensing line), a second amplifier 242 connected to the third pixel PXL3 through the data line Dj+1 of the third pixel PXL3 (or an additional sensing line), a first analog-to-digital converter ("ADC") 243 connected to an output terminal OUT of the first amplifier 241, and a second ADC 244 connected to an output terminal OUT of the second amplifier 242. According to an exemplary embodiment, the sensor unit 240 may be driven by the sensing control signal SECS (refer to FIG. 1) supplied from the timing controller 250 (refer to FIG. 1) as described above.

According to an exemplary embodiment, a first input terminal IN1 (for example, an inverting input terminal) of the first amplifier 241 is connected to the data line Dj of the second pixel PXL2 and a second input terminal IN2 (for example, a non-inverting input terminal) may be connected to a reference power source Vref. The output terminal OUT of the first amplifier 241 may be connected to an input terminal of the first ADC 243. In addition, a first capacitor C1 and a reset switch SWr may be connected in parallel between the first input terminal IN1 and the output terminal OUT of the first amplifier 241. That is, according to an exemplary embodiment, the first amplifier 241 may operate an integrator. In addition, a second capacitor C2 for stabilizing an output of the first amplifier 241 may be further connected to the output terminal OUT of the first amplifier 241. The first amplifier 241 amplifies current input from the second pixel PXL2 via the switching element SWse and outputs the amplified current in the predetermined sensing period.

According to an exemplary embodiment, a first input terminal IN1 (for example, an inverting input terminal) of the second amplifier 242 is connected to the data line Dj+1 of the third pixel PXL3 and a second input terminal IN2 (for example, a non-inverting input terminal) may be connected to the reference power source Vref. The output terminal OUT of the second amplifier 242 may be connected to an input terminal of the second ADC 244. In addition, the first capacitor C1 and the reset switch SWr may be connected in parallel between the first input terminal IN1 and the output terminal OUT of the second amplifier 242. That is, according to an exemplary embodiment, the second amplifier 242 may operate an integrator. In addition, the second capacitor C2 for stabilizing an output of the second amplifier 242 may be further connected to the output terminal OUT of the second amplifier 242. The second amplifier 242 amplifies current input from the data line Dj+1 of the third pixel PXL3 and outputs the amplified current in the predetermined sensing period. That is, the second amplifier 242 amplifies leakage current that flows through the data line Dj+1 of the third pixel PXL3 and outputs the amplified leakage current in the sensing period.

According to an exemplary embodiment, the first ADC 243 is connected to the output terminal OUT of the first amplifier 241. The first ADC 243 converts an analog signal input from the output terminal OUT of the first amplifier 241 into the digital sensing signal Sse and outputs the digital sensing signal Sse.

According to an exemplary embodiment, the second ADC 244 is connected to the output terminal OUT of the second amplifier 242. The second ADC 244 converts an analog signal input from the output terminal OUT of the second amplifier 242 into a digital noise signal Sno and outputs the digital noise signal Sno.

The sensing signal Sse and the noise signal Sno that are output from the first ADC 243 and the second ADC 244 are supplied to the above-described timing controller 250. Then, the timing controller 250 may remove a noise component included in the sensing signal Sse by subtracting the noise signal Sno from the sensing signal Sse. Therefore, the timing controller 250 may correctly detect the current that flows through the second pixel PXL2 and may select the division scanning condition applied to the first mode in response to the current that flows through the second pixel PXL2.

Figure 13:
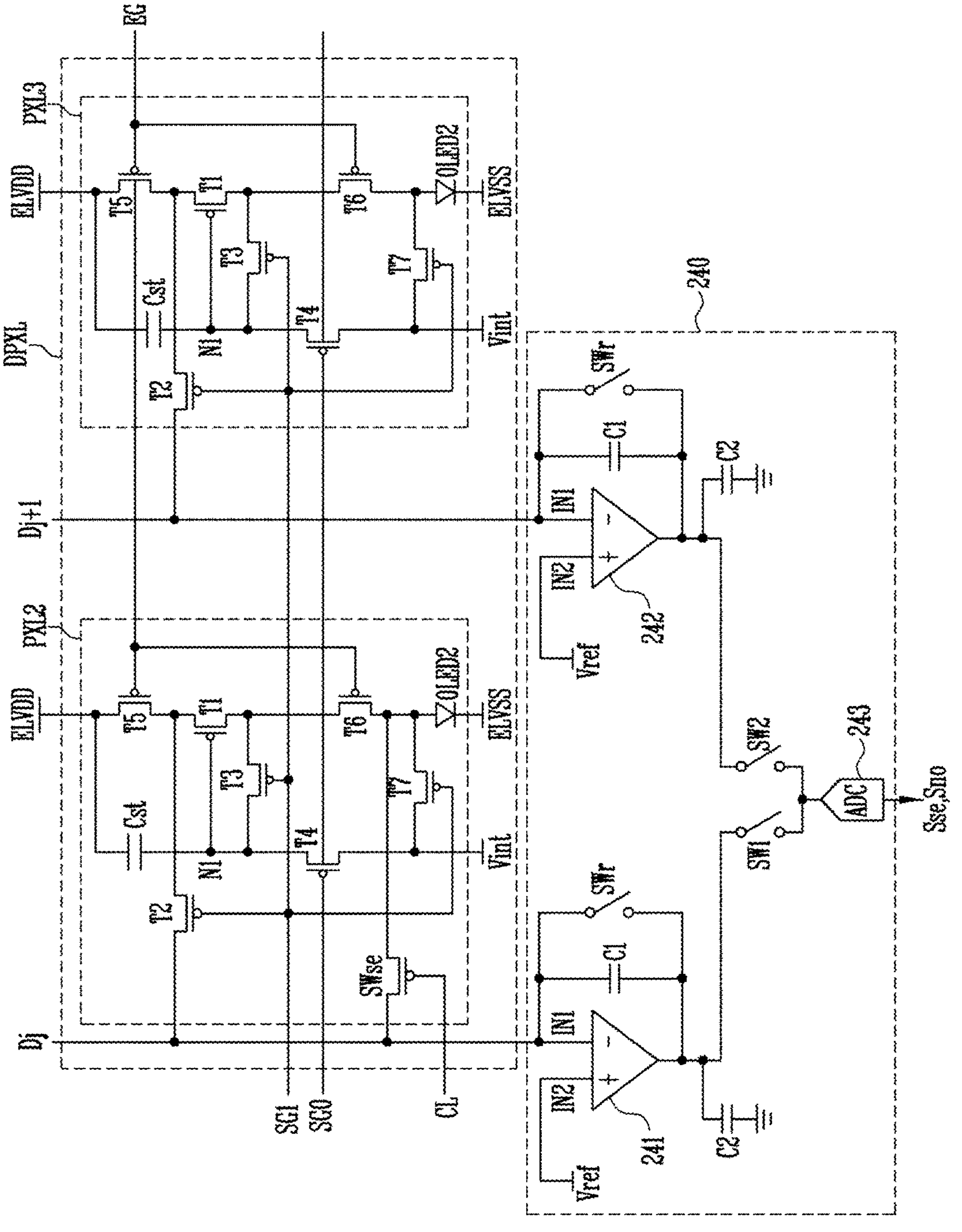
FIGS. 13 through 15 are views illustrating other exemplary embodiments of the dummy pixel row and the sensor unit of FIG. 1.
Figure 14:
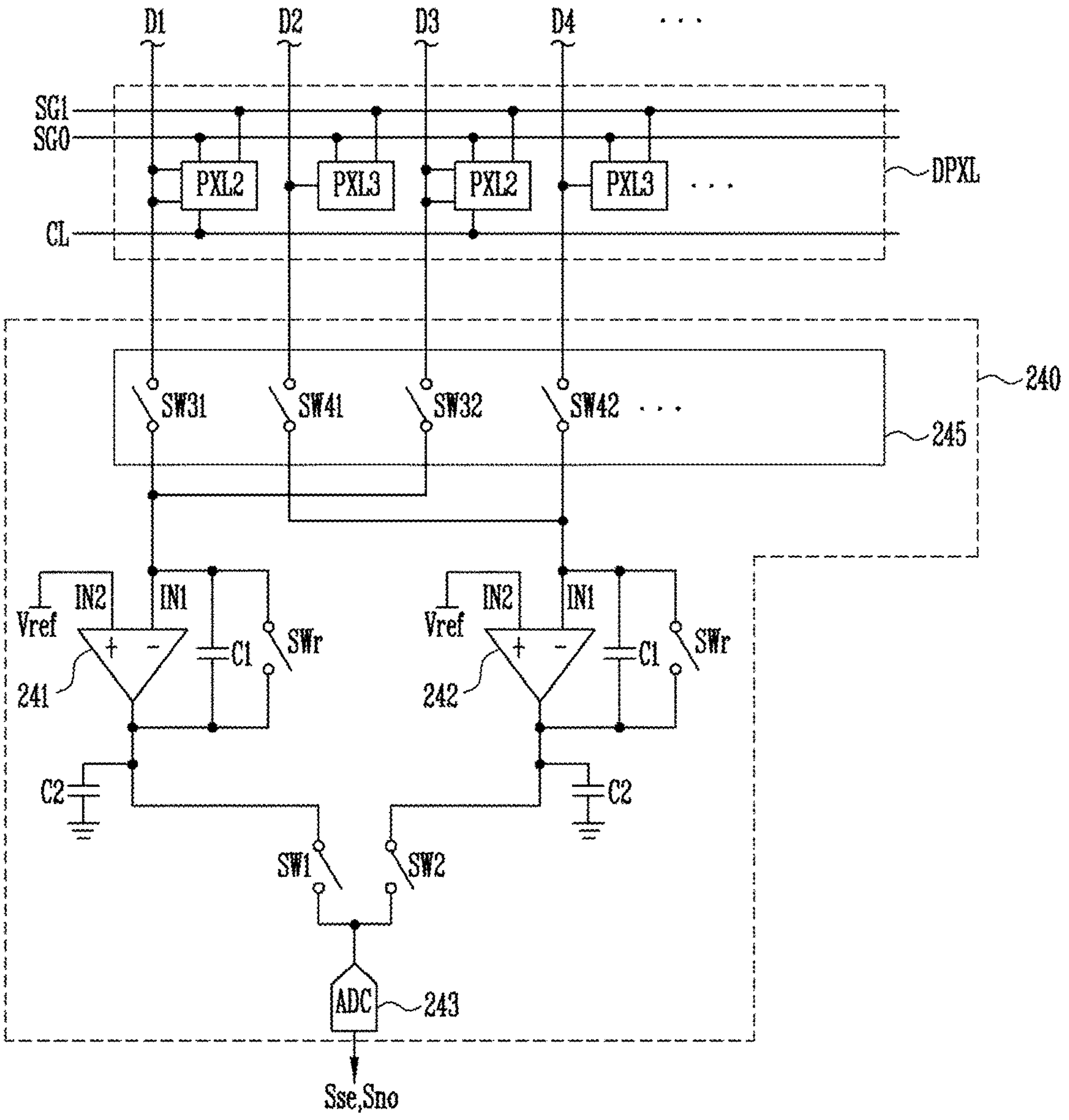
Figure 15:
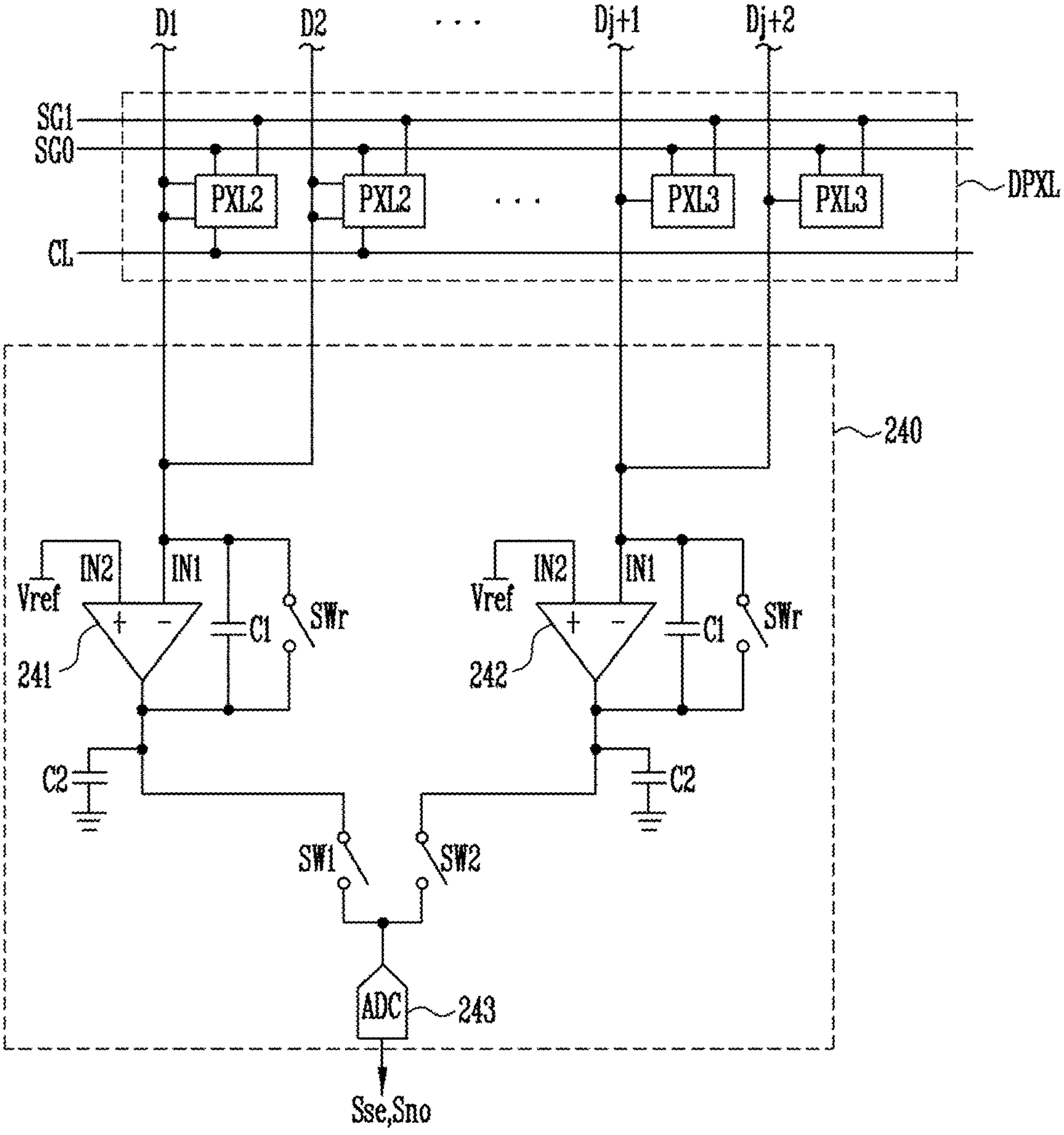

FIGS. 13 through 15 are views illustrating other exemplary embodiments of the dummy pixel row and the sensor unit of FIG. 1 and other modified embodiments of the exemplary embodiment of FIG. 12. Therefore, in FIGS. 13 through 15, the same elements as those of FIG. 12 are denoted by the same reference numerals and detailed description thereof will not be given.

Referring to FIG. 13, the first and second amplifiers 241 and 242 may share one ADC, for example, the first ADC 243. In this case, a pair of switches SE1 and SE2 may be connected between the first and second amplifiers 241 and 242 and the first ADC 243.

The first switch SW1 is connected between the first amplifier 241 and the first ADC 243 and the second switch SW2 is connected between the second amplifier 242 and the first ADC 243. The first and second switches SW1 and SW2 are turned on in different periods in the sensing period. According to an exemplary embodiment, operations of the first and second switches SW1 and SW2 may be controlled by the timing controller 250 (refer to FIG. 1).

When the first switch SW1 is turned on, the sensing signal Sse is output from the sensor unit 240. When the second switch SW2 is turned on, the noise signal Sno is output from the sensor unit 240. Then, the sensing signal Sse and the noise signal Sno are supplied to the timing controller 250 and may be used for setting the division scanning condition applied to the first mode.

According to another exemplary embodiment of the invention, the first ADC 243 may be implemented by a differential ADC with two input terminals, for outputting a digital signal corresponding to a voltage difference between the two input terminals. In this case, the first and second switches SW1 and SW2 are omitted and the two input terminals of the first ADC 243 may be directly connected to the output terminals OUT of the first and second amplifiers 241 and 242. When the sensor unit 240 outputs a digital signal corresponding to a voltage difference between the sensing signal Sse and the noise signal Sno, information on the current that flows through the second pixel PXL2 may be correctly transmitted to the timing controller 250.

As described above, according to the exemplary embodiment, the first and second amplifiers 241 and 242 share one ADC, for example, the first ADC 243, a deviation in output of the ADCs may be prevented. Therefore, the current that flows through the second pixel PXL2 may be correctly extracted.

Referring to FIG. 14, the dummy pixel row DPXL may include at least two second pixels PXL2 and third pixels PXL3. In an exemplary embodiment, the second and third pixels PXL2 and PXL3 may be alternately arranged in the dummy pixel row DPXL, for example. According to an exemplary embodiment, the data lines D1, D3, . . . of the second pixels PXL2 are commonly connected to the first amplifier 241 and the data lines D2, D4, . . . of the third pixels PXL3 may be commonly connected to the second amplifier 242, for example. In this case, the sensor unit 240 may further include a selecting unit 245 connected between the first and second amplifiers 241 and 242.

According to an exemplary embodiment, the selecting unit 245 may include a plurality of third switches SW31, SW32, . . . and fourth switches SW41, SW42, . . . . The third switches SW31, SW32, . . . are connected between the second pixels PXL2 and the first amplifier 241 and may selectively connect the second pixels PXL2 to the first amplifier 241. The fourth switches SW41, SW42, . . . are connected between the data lines D2, D4, . . . of the third pixels PXL3 and the second amplifier 242 and may selectively connect the data lines D2, D4, . . . of the third pixels PXL3 to the second amplifier 242.

According to an exemplary embodiment, an operation of the selecting unit 245 may be controlled by the timing controller 250 (refer to FIG. 1). In an exemplary embodiment, the third switches SW31, SW32, . . . are simultaneously turned on in the sensing period in response to the sensing control signal SECS (refer to FIG. 1) from the timing controller 250 or may be alternately turned on, for example. In addition, the fourth switches SW41, SW42, . . . are simultaneously turned on in the sensing period in response to the sensing control signal SECS or may be alternately turned on.

Referring to FIG. 15, the dummy pixel row DPXL may include at least two second pixels PXL2 and third pixels PXL3. The second pixels PXL2 are commonly connected to the first amplifier 241 and the data lines Dj, Dj+1, . . . of the third pixels PXL3 may be commonly connected to the second amplifier 242. According to the above-described embodiment, the first amplifier 241 amplifies currents simultaneously input from the second pixels PXL2 and outputs the amplified currents in the sensing period and the second amplifier 242 amplifies currents simultaneously input from the data lines Dj, Dj+1, . . . of the third pixels PXL3 and may output the amplified currents in the sensing period.

According to the invention, the structures of the dummy pixel row DPXL provided in the second pixel region 102 (refer to FIG. 1) and the sensor unit 240 connected to the dummy pixel row DPXL are not limited to those of the above-described embodiments. In an exemplary embodiment, the sensor unit 240 may be implemented by currently known various types of current sensors including a current system, for example. That is, the structures and/or operations of the dummy pixel row DPXL and the sensor unit 240 may vary.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the invention as set forth in the following claims.

What is claimed is:

1. A display device comprising:

a first pixel region including a plurality of first scan lines, a plurality of data lines and a plurality of first pixels connected to the plurality of first scan lines and the plurality of data lines;

a second pixel region including a second scan line and a control line and a second pixel connected to the second scan line and the control line;

a scan driver which drives at least one of the plurality of first scan lines;

a sensor unit which is connected to the second pixel and senses current which flows through the second pixel in response to a sensing mode in a predetermined sensing period; and a timing controller which drives the sensor unit in response to the sensing mode and controls a driving order of the plurality of first scan lines in response to a first mode, wherein the timing controller divides one frame period into a plurality of sub-periods in response to the first mode, controls the scan driver so that at least two of the plurality of first scan lines sequentially arranged in the first pixel region are driven in different sub-periods of the plurality of sub-periods, and sets a driving condition of the plurality of first scan lines in the first mode in response to a sensing signal input from the sensor unit in the predetermined sensing period, and wherein the timing controller sets a number of the plurality of sub-periods in response to an amplitude of the sensing signal and the driving order of the plurality of first scan lines in response to the number of the plurality of sub-periods.

2. The display device of claim 1, wherein the driving condition of the plurality of first scan lines comprises at least one of the driving order of the plurality of first scan lines and a time difference between scan signals supplied to the sequentially arranged at least two of the plurality of first scan lines.

3. The display device of claim 1, wherein the timing controller controls a time difference between scan signals supplied to the sequentially arranged at least two of the plurality of first scan lines in a period in which the first mode is executed in response to a shape of a curve of the sensing signal.

4. The display device of claim 1, wherein each of the plurality of first pixels comprises:

a first pixel circuit connected to a predetermined first scan line of the plurality of first scan lines and a predetermined data line of the plurality of data lines; and a first organic light emitting diode connected to the first pixel circuit.

5. The display device of claim 4, wherein the second pixel comprises:

a second pixel circuit connected to the second scan line and a predetermined data line of the plurality of data lines;

a second organic light emitting diode connected to the second pixel circuit; and a switching element including a first electrode connected to the second pixel circuit and the second organic light emitting diode, a second electrode connected to the sensor unit through the predetermined data line, and a control electrode connected to the control line.

6. The display device of claim 5, wherein the first pixel circuit and the second pixel circuit have a same structure.

7. The display device of claim 5, wherein the second scan line receives a scan signal of a gate on voltage in a first period of the predetermined sensing period, and wherein the control line receives a control signal of a gate on voltage in a second period subsequent to the first period of the predetermined sensing period.

8. The display device of claim 5, wherein the sensor unit comprises:

a first amplifier which is connected to a data line of the plurality of data lines connected to the second pixel and amplifies current input from the second pixel via the switching element in the predetermined sensing period; and a first analog-to-digital converter connected to an output terminal of the first amplifier.

9. The display device of claim 8, wherein the second pixel region further comprises a third pixel connected to the second scan line and having a same structure as that of the second pixel excluding the switching element.

10. The display device of claim 9, wherein the sensor unit further comprises a second amplifier which is connected to a data line of the plurality of data lines connected to the third pixel and amplifies current input from the data line connected to the third pixel in the predetermined sensing period.

11. The display device of claim 10, wherein the sensor unit further comprises:

a first switch connected between the first amplifier and the first analog-to-digital converter; and a second switch connected between the second amplifier and the first analog-to-digital converter and turned on in a period different from a period in which the first switch is turned on in the predetermined sensing period.

12. The display device of claim 10, wherein the second pixel region further comprises at least two second pixels and at least two third pixels, and wherein the sensor unit further comprises a selecting unit including a plurality of third switches connected between the second pixels and the first amplifier and a plurality of fourth switches connected between data lines of the plurality of data lines connected to the at least two third pixels and the second amplifier.

13. The display device of claim 10, wherein the second pixel region further comprises at least two second pixels and at least two third pixels, and wherein the first amplifier is commonly connected to the second pixels and the second amplifier is commonly connected to data lines of the plurality of data lines connected to the at least two third pixels.

14. The display device of claim 1, wherein a predetermined standby image is displayed in response to a first driving frequency in a period in which the first mode is executed.

15. The display device of claim 14, wherein the timing controller controls the scan driver so that the plurality of first scan lines is sequentially driven in response to a second mode in which the display device is driven at a second driving frequency higher than the first driving frequency.

16. A method of driving a display device, the method comprising:

sensing current which flows through at least one pixel provided in a display panel and generating a sensing signal in a predetermined sensing period;

controlling a driving condition of scan lines in a first mode in response to the sensing signal; and dividing one frame period into a plurality of sub-periods in a period in which the first mode is executed and driving the scan lines so that at least two scan lines sequentially arranged in a display region among the scan lines are driven in different sub-periods of the plurality of sub-periods, wherein the controlling the driving condition of the scan lines in the first mode comprises setting at least one of a driving order of the scan lines and a time difference between scan signals supplied to the sequentially arranged at least two of the scan lines in response to the sensing signal, and wherein a number of the plurality of sub-periods is set in response to an amplitude of the sensing signal and the driving order of the scan lines is set in response to the number of the plurality of sub-periods.

17. The method of claim 16, wherein the time difference between the scan signals supplied to the sequentially arranged at least two of the scan lines is controlled in the period in which the first mode is executed, in response to a shape of a curve of the sensing signal.

18. The method of claim 16, wherein the scan lines arranged in the display region are sequentially driven in response to a second mode in which the display device is driven at a higher frequency than in the first mode.

* * * * *